United States Patent
Hull et al.

(10) Patent No.: US 7,428,578 B1
(45) Date of Patent: Sep. 23, 2008

(54) REMOTELY INITIATED DOCUMENT TRANSMISSION

(75) Inventors: Jonathan J Hull, San Carlos, CA (US); Derek E Poppink, Mountain View, CA (US)

(73) Assignee: Ricoh Co., Ltd, Minato-Ku, Tokyo (JP)

( * ) Notice: Subject to any disclaimer, the term of this patent is extended or adjusted under 35 U.S.C. 154(b) by 611 days.

(21) Appl. No.: 10/188,912

(22) Filed: Jul. 2, 2002

(51) Int. Cl.
*G06F 15/16* (2006.01)

(52) U.S. Cl. ....................................... 709/206
(58) Field of Classification Search ......... 709/204–206, 709/207, 217, 218, 201, 213, 214, 219
See application file for complete search history.

(56) References Cited

U.S. PATENT DOCUMENTS

| | | | |
|---|---|---|---|
| 5,809,167 A | 9/1998 | Al-Hussein | |
| 5,826,269 A | 10/1998 | Hussey | |
| 5,844,969 A * | 12/1998 | Goldman et al. | 379/93.24 |
| 5,859,971 A * | 1/1999 | Bittinger et al. | 709/203 |
| 5,905,777 A * | 5/1999 | Foladare et al. | 379/90.01 |
| 5,911,776 A | 6/1999 | Guck | |
| 5,973,695 A * | 10/1999 | Walsh et al. | 715/854 |
| 5,978,837 A * | 11/1999 | Foladare et al. | 709/207 |
| 6,160,631 A | 12/2000 | Okimoto et al. | |
| 6,173,322 B1 * | 1/2001 | Hu | 709/224 |
| 6,236,768 B1 | 5/2001 | Rhodes et al. | |
| 6,256,666 B1 * | 7/2001 | Singhal | 709/217 |
| 6,327,590 B1 | 12/2001 | Chidlovskii et al. | |
| 6,397,228 B1 | 5/2002 | Lamburt et al. | |
| 6,449,637 B1 | 9/2002 | Toga | |
| 6,487,278 B1 | 11/2002 | Skladman et al. | |
| 6,505,237 B2 * | 1/2003 | Beyda et al. | 709/206 |
| 6,542,892 B1 | 4/2003 | Cantwell | |
| 6,636,250 B1 * | 10/2003 | Gasser | 715/853 |
| 6,670,968 B1 | 12/2003 | Schilit et al. | |
| 6,697,942 B1 * | 2/2004 | L'Heureux et al. | 713/152 |
| 6,714,968 B1 | 3/2004 | Prust | |
| 6,741,855 B1 * | 5/2004 | Martin et al. | 455/419 |
| 6,801,935 B2 | 10/2004 | Shen | |
| 6,859,832 B1 | 2/2005 | Gecht et al. | |

(Continued)

OTHER PUBLICATIONS

Marsan, C. D., "Printing to get 'Net Facelift," [online]. NetworkWorldFusion, Jul. 10, 2000, [retrieved on Sep. 19, 2002]. 4 Pages. Retrieved from the Internet: <URL: http://www.nwfusion.com/cgi-bin/mailto/x.cgi>. (Copy enclosed).

PrintMe Networks web pages [online]. PrintMe Networks [retrieved on Sep. 19, 2002]. 18 Pages. Retrieved from the Internet: <URL: https://www.printme.com/>. (Copy enclosed).

Almaden Computer Science Research, BlueEyes Suitor [online]. IBM [retrieved on Jan. 10, 2002]. Retrieved from the Internet: <URL: http://www.almaden.ibm.com/cs/blueeyes/suitor.html>. (1 page).

(Continued)

*Primary Examiner*—William C. Vaughn, Jr.
*Assistant Examiner*—Yemane Mesfin
(74) *Attorney, Agent, or Firm*—Fenwick & West LLP

(57) ABSTRACT

A method, system, computer program product, and user interface for securely and remotely selecting and initiating transmission of stored electronic documents from one device to another. The user may perform such operations with respect to documents on a source PC from any network-connected location, regardless of whether a firewall is present. A directory representation of the source PC's hard drive is transmitted to the user at his or her remote location. The user can navigate within the directory representation to select a document for transmission to a specified destination. An e-mail message is transmitted from the user's remote location to the source PC that causes the selected document to be packaged as an attachment and transmitted to the specified destination.

58 Claims, 15 Drawing Sheets

U.S. PATENT DOCUMENTS

| | | | |
|---|---|---|---|
| 6,876,462 | B2 | 4/2005 | Okada et al. |
| 6,952,724 | B2 | 10/2005 | Prust |
| 6,989,910 | B2 | 1/2006 | Lomas et al. |
| 6,993,527 | B1 | 1/2006 | Raman et al. |
| 7,000,001 | B2 | 2/2006 | Lazaridis |
| 7,047,242 | B1 | 5/2006 | Ponte |
| 7,080,099 | B2 * | 7/2006 | Tada et al. ............... 707/104.1 |
| 7,110,998 | B1 | 9/2006 | Bhandari et al. |
| 7,136,180 | B2 | 11/2006 | Utsonomiya |
| 7,203,725 | B1 | 4/2007 | Gilmour et al. |
| 7,305,381 | B1 | 12/2007 | Poppink et al. |
| 2001/0013029 | A1 | 8/2001 | Gilmour |
| 2001/0034774 | A1 | 10/2001 | Watanabe et al. |
| 2001/0042032 | A1 | 11/2001 | Crawshaw et al. |
| 2002/0019851 | A1 | 2/2002 | Pollack |
| 2002/0042838 | A1 | 4/2002 | Tabayoyon et al. |
| 2002/0073076 | A1 | 6/2002 | Xu et al. |
| 2002/0131070 | A1 | 9/2002 | Housel et al. |
| 2002/0140989 | A1 | 10/2002 | Shinchi et al. |
| 2002/0191210 | A1 | 12/2002 | Staas et al. |
| 2002/0194307 | A1 * | 12/2002 | Anderson et al. ........... 709/219 |
| 2003/0028587 | A1 | 2/2003 | Driscoll et al. |
| 2003/0030834 | A1 | 2/2003 | Parry |
| 2003/0035136 | A1 | 2/2003 | Yamagishi et al. |
| 2003/0063309 | A1 | 4/2003 | Parry |
| 2003/0069877 | A1 | 4/2003 | Grefenstette et al. |
| 2003/0086124 | A1 | 5/2003 | Parry |
| 2003/0187951 | A1 | 10/2003 | Shen |
| 2003/0236871 | A1 | 12/2003 | Thurlow |
| 2004/0019643 | A1 | 1/2004 | Zirnstein, Jr. |
| 2004/0088318 | A1 | 5/2004 | Brady |
| 2004/0177159 | A1 | 9/2004 | Butterfield et al. |

OTHER PUBLICATIONS

"Autonomy Technology White Paper," Autonomy Systems Ltd., 19 pages, Feb. 2001.

Clarke, I., "A Distributed Decentralised Information Storage and Retrieval System," Division of Informatics, University of Edinburgh, pp. 1-43, 1999.

"Discover More: A Technical White Paper on the Stratify Discovery System," Stratify, Inc., v1.1, pp. 1-18, Aug. 2001.

Microsoft Office—White Paper: Overview of Smart Tag Technology in Office XP [online]. Microsoft, Inc. [retrieved on Oct. 2, 2001]. Retrieved from the Internet: <URL: http://www.microsoft.com/office/developer/platform/smartag.htm.>. (4 pages).

Microsoft Office & Visual Basic for Applications Developer, Interacting with Smart Tags, The SmartTags Collection and SmartTag Object [online]. Microsoft, Inc. [retrieved on Oct. 2, 2001]. Retrieved from the Internet: <URL: http://msdn.microsoft.com/library/en-us/dnovba01/html/interactingwithsmarttags.asp?frame>. (10 pages).

Projects, Watson [online]. InfoLab [retrieved on Jan. 10, 2002]. Retrieved from the Internet: <URL: http://dent.infolab.nwu.edu/infolab/projects/project.asp?ID=5>. (2 pages).

Rhodes, B.J., and Maes, P., "Just-in-time Information Retrieval Agents," IBM Systems Journal, vol. 39, Nos. 3&4, p. 685-704, 2000.

Rhodes, B. J., "Just-In-Time Information Retrieval," Program in Media Arts and Sciences, Massachusetts Institute of Technology, pp. 1-133, May 2000.

RichLink Technology: How RichLink Works [online]. Sentius Corporation 1993-2001 [retrieved on Jan. 10, 2002]. Retrieved from the Internet: <URL: http://www.sentius.com/RL/english/solutions/c_30301.html>. (2 pages).

Wood, D., "Programming Internet Email," Sebastopol, CA, O'Reily and Associates, 1999, pp. 38-40 and 46-57.

* cited by examiner

REMOTELY INITIATED DOCUMENT TRANSMISSION

CROSS-REFERENCE TO RELATED APPLICATIONS

The present application is related to U.S. patent application Ser. No. 10/046,447 for "Asynchronous Unconscious Retrieval in a Network of Information Appliances," filed Oct. 29, 2001, the disclosure of which is incorporated herein by reference.

The present application is related to U.S. patent application Ser. No. 10/163,542 for "Remote Retrieval of Documents," filed Jun. 5, 2002, the disclosure of which is incorporated herein by reference.

The present application is further related to U.S. patent application Ser. No. 10/189,752 for "E-Mail Transmission of Print-Ready Documents," filed on the same date as the present application, the disclosure of which is incorporated herein by reference.

BACKGROUND OF THE INVENTION

1. Field of the Invention

The present invention is related to document retrieval, and more particularly to securely and remotely selecting and initiating transmission of electronic documents from one device to another.

2. Description of the Background Art

E-mail transmission of documents from one computer to another is well known. Established network transmission protocols, such as Simple Mail Transfer Protocol (SMTP), used in conjunction with Transmission Control Protocol/Internet Protocol (TCP/IP), provide mechanisms for attaching files to e-mails for transmission across the Internet.

Existing e-mail client software, such as Microsoft Outlook, provides user interface functionality for selecting files from a user's hard drive, attaching the files to an e-mail message, and initiating transmission of the e-mail message. Referring now to FIGS. 1A through 1C, there is shown an example of a user interface for attaching a file to an e-mail message according to the prior art.

In FIG. 1A, a window 100 is shown for composing an e-mail message. The e-mail message body 102 includes text that the user has typed in. The user clicks on attachment icon 101, designated by a representation of a paper clip, to initiate the process of attaching a file to the e-mail message.

FIG. 1B shows an example of a dialog box 110 that is presented in response to the user clicking on icon 101. Dialog box 110 contains a standard user interface for navigating through a hierarchical file system. The user can select a directory using pulldown menu 113, button 114, and other on-screen controls. In this manner, the user can select among directories, folders, and files that are stored on a local hard drive, or on a network-connected resource such as a file server or another computer on which file sharing has been made available. Pane 111 displays a list of files contained within a current directory. The user selects a file 112 (or several files), for example by clicking with the on-screen cursor. The user clicks on Insert button 112 to cause the selected file or files to be attached to the e-mail message.

Referring now to FIG. 1C, there is shown window 100 after the user has attached a file to the e-mail message. Message body 102 now includes icon 120 representing the attached file. The user can now click on Send button 121 to initiate transmission of the e-mail message to the specified recipient. The attached file will be transmitted along with the text of the message.

The above-described scheme, as well as similar conventional schemes for sending files and documents via e-mail, is subject to significant limitations. In particular, the only files that can be selected for attachment are those that are locally stored or available over a network from a file server or shared file system. Such a limitation engenders significant inconvenience for users when sending e-mails from remote locations, via personal digital assistants (PDAs), or other out-of-office situations.

For example, a user may have a PC at his or her office. While the user is at another location (such as at home, or at a client, or traveling), he or she may wish to transmit a document from the PC to a recipient, for example as an e-mail attachment. Even if the user has access to a network-connected computer or other device, and even if the PC that contains the document file is powered up and network-connected at the time the user wishes to transmit it to the recipient, there is generally no easy way for the user to remotely select and retrieve a document from the PC without having anticipated such a need beforehand and performing relatively burdensome setup operations. For example, a user may set up his or her PC to act as a network server, thus making the contents (or a subset of the contents) of the PC's hard drive available over a network; however, such a solution is cumbersome and difficult for most users, and may also introduce significant security risks. Alternatively, the user may set up file-sharing to make his or her files available over a network; however, such a solution carries additional security risks and may expose the user's hard drive to access or tampering by unauthorized users.

In addition, many companies have installed network firewalls to guard against unauthorized access to network-connected resources; such firewalls generally block remote access to the devices within the network (including users' PCs). In cases where such a firewall is in place, users generally cannot remotely access files on their PCs without deactivating or reconfiguring the firewall.

One solution to the above-described problem is for the user to have all their files available locally at all times. Such a solution is theoretically possible, as the user may copy all of his or her data to a portable machine such as a laptop computer or a personal digital assistant (PDA) and carry the portable machine containing all the files, wherever the user goes. However, such a technique imposes significant overhead, is burdensome in that it requires the user to continually keep the portable documents updated, and can result in errors if the portable versions of documents fall out of sync with the versions stored on the non-portable PC (for example, if the stored documents are modified after they have been copied onto the portable device). Many portable devices have insufficient storage capacity to store a large number of documents as a user may have on his or her PC. Furthermore, the portable machine may be lost, stolen, or damaged during travel, potentially resulting in data loss and/or unauthorized access to the user's data by anyone who steals or finds the device. Finally, such a technique requires that the user anticipate his or her document needs, which is not always feasible or possible.

What is needed is a technique for allowing a user to remotely and securely select and initiate transmission of files on his or her PC, from virtually any network-connected location. What is further needed is a technique that allows such remote operations even when a firewall is in place. What is further needed is a technique of, from a remote computer, initiating e-mail transmission of files from one location to another.

SUMMARY OF THE INVENTION

In the following description, the term "source PC" refers to a PC (or other device) on which a desired electronic document is stored. The document may be stored, for example, on a hard drive attached to the PC, or on another storage device (such as a network-connected drive) to which the PC has access. The term "destination" refers to a PC (or other device) to which the electronic document is to be sent. The terms "remote PC" and "remote location" refer to the location from which the user initiates the transmission of the electronic document. Generally, in the examples provided below, the user is at a location that is remote with respect to both the source PC and the destination; however the pre-sent invention may be practiced regardless of the actual physical locations of the user and the devices.

The present invention provides techniques for securely and remotely selecting and initiating transmission of electronic documents from one device to another. The user may perform such operations from any network-connected location, even if the location is remote with respect to the source and destination of the electronic documents, and regardless of whether a firewall is present.

The present invention operates as follows. A directory representation of the source PC hard drive is transmitted to the user at his or her remote location. The user can navigate within the directory representation to select a file or files for transmission. The user also specifies a destination for the file or files, by entering or selecting an e-mail address. An e-mail message is transmitted from the user's remote location to the source PC that causes the selected document to be packaged as an attachment and transmitted to the destination. In one embodiment, the transmission of the directory representation, the document request, and the retrieved document are all implemented as e-mail messages; thus, the transmissions can take place even if a firewall is present. In one embodiment, the system employs a one-time pad technique to authenticate the user and to block unauthorized access to documents. E-mail messages for transmitting requests, directory information, and documents may be encrypted so as to ensure that the information contained therein remains confidential.

The source PC can be pre-configured to respond to authenticated document requests received from the user. In one embodiment, the source PC automatically responds to such requests by transmitting, to the specified destination, an e-mail containing the requested document as an attachment. Depending on the type of access requested, the document can be provided in any desired format; for example, if the user is interested in printing the document, the source PC transmits a print-ready version of the document, such as a portable document format (PDF) file.

In one application of the invention, a user can initiate e-mail transmission of document from a source PC (such as the user's office PC), while he or she is at a different physical location as the source PC. The user accesses a remote PC, or other device such as a printer or multifunction device, that includes an interface that allows the user to authenticate himself or herself, and to identify the source PC from which the document is to be retrieved. The remote PC sends a request to the source PC, and receives a directory representation of the source PC's storage device via e-mail. The user navigates through the directory representation using the interface provided at the remote PC. The user selects the document to be printed. The remote PC then transmits an e-mail request to the source PC, identifying the document and the type of access desired; for example, if the destination is a remote printer, the requested format can be a print-ready format. The source PC responds automatically by e-mailing the document as an attachment, in the specified format. Upon receipt of the e-mail, the destination device performs an appropriate action, such as making the document available in an e-mail program, or displaying the contents of the document, or printing the document. All of these steps take place in seconds, while the user is at the remote PC. Thus, the user can select and transmit documents from his or her own PC (the source PC) while located at a remote PC.

The present invention thus allows remote selection and initiation of transmission of documents from a source PC, without compromising security and without requiring the user to set up and configure a server on the source PC. In addition, the invention is able to operate in virtually any network-connected environment, even if a firewall is present. Finally, the invention avoids the limitations and disadvantages of prior art schemes for transmitting documents via electronic mail.

Figure 1A:
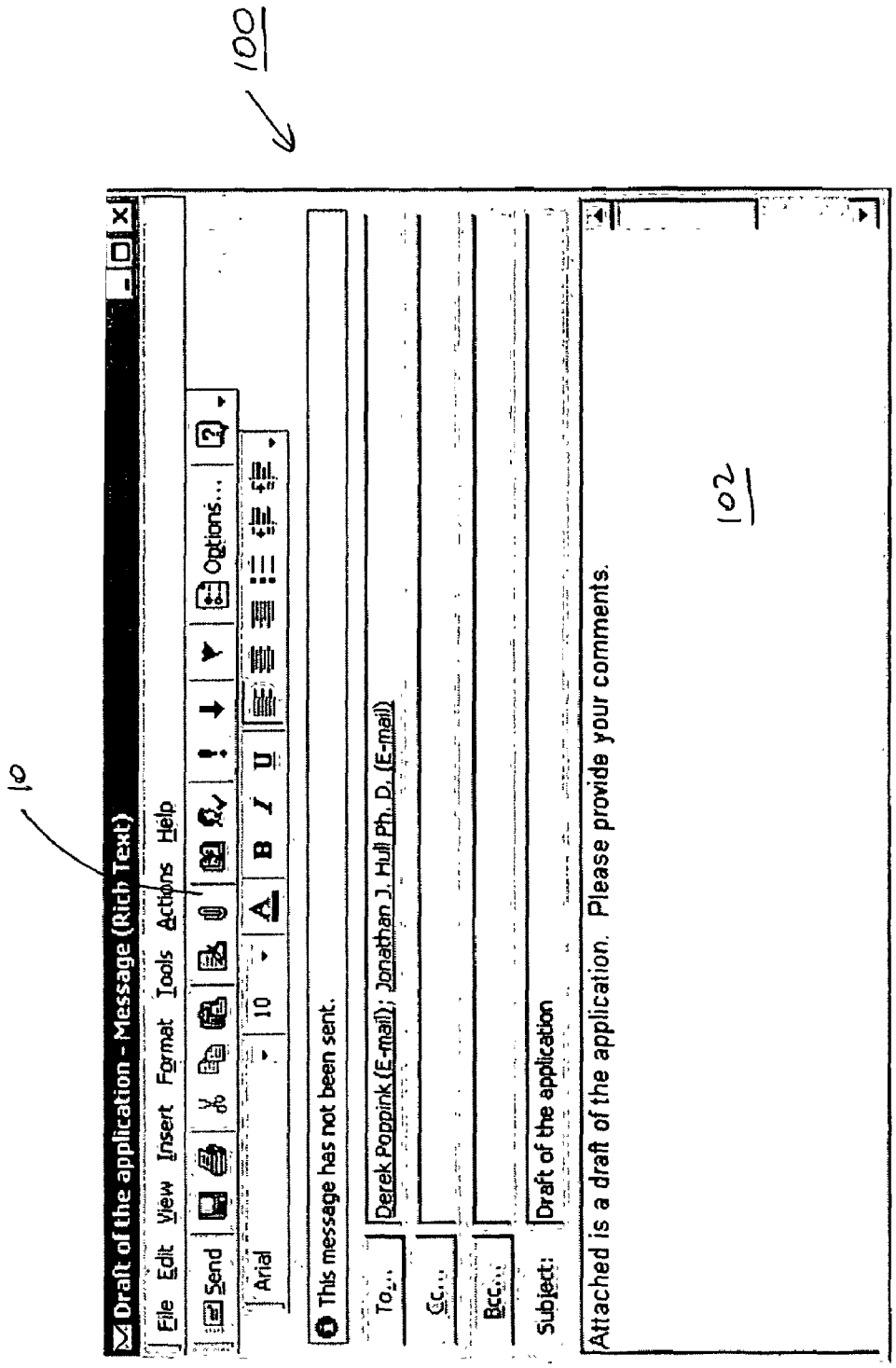
FIGS. 1A, 1B, and 1C are screen shots depicting a user interface for initiating e-mail transmission of a document according to the prior art.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system. Such an information system as claimed may be the entire workflow system as detailed below in the preferred embodiment or only portions of such a system. For example, the present invention can operate with an information system that need only be a browser in the simplest sense to present and display objects. Thus, the present invention is capable of operating with any information system from those with minimal functionality to those providing all the functionality disclosed herein.

System

Figure 2:
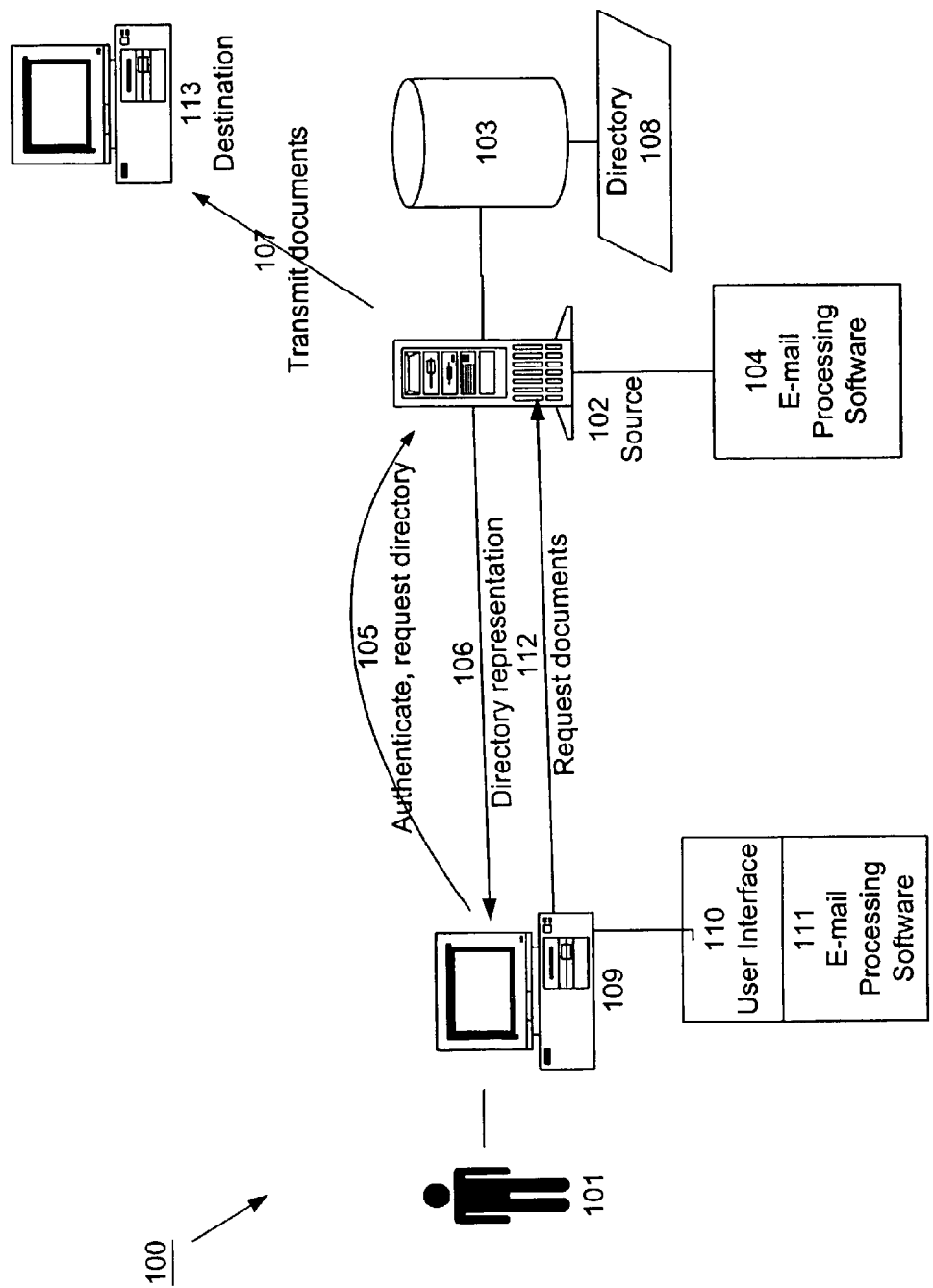
FIG. 2 is a block diagram depicting a system for remotely selecting and initiating transmission of electronic documents according to the present invention.
Figure 10:
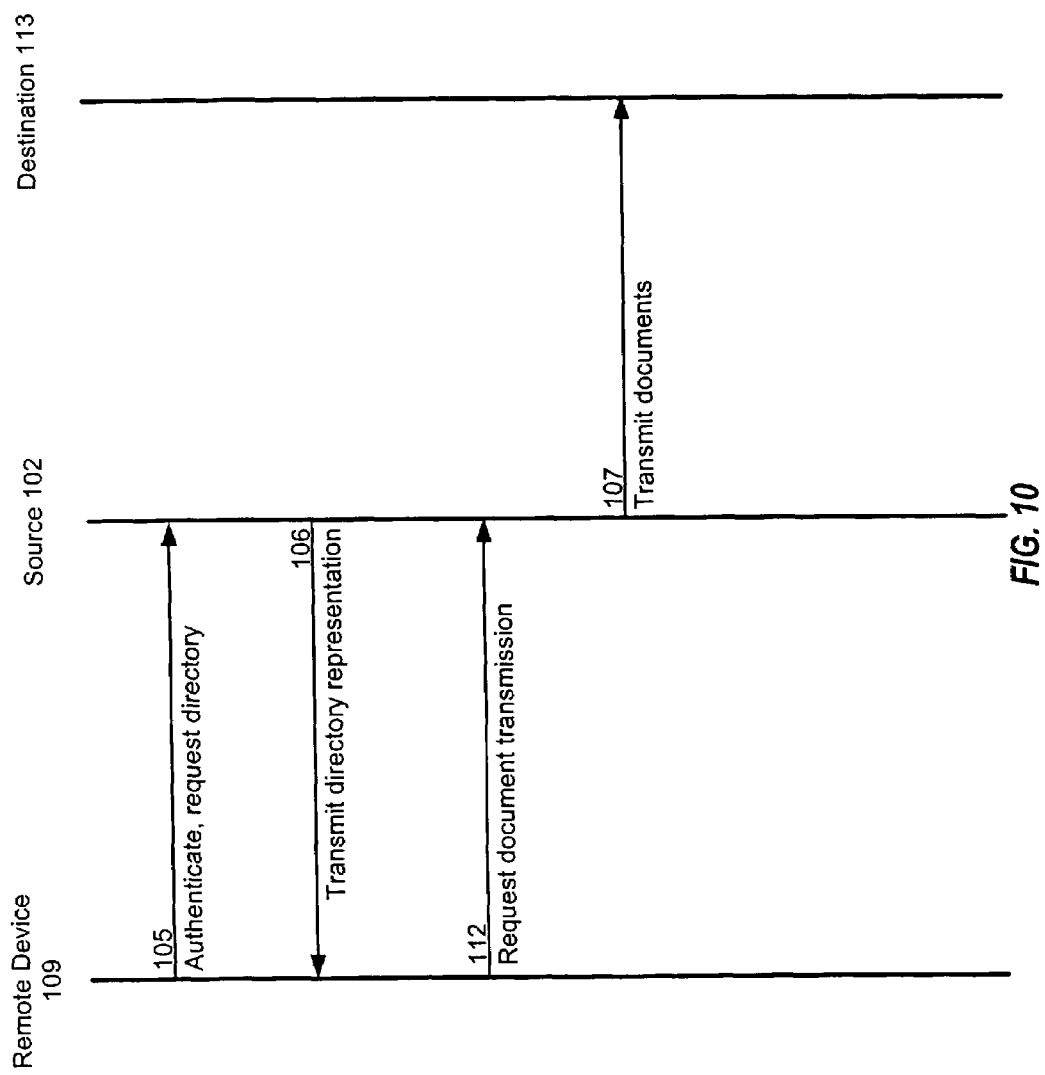
FIG. 10 is an event trace diagram depicting a series of steps for remotely selecting and initiating transmission of electronic documents according to one embodiment of the present invention.

Referring now to FIG. 2, there is shown a block diagram depicting a system 100 for remotely selecting and initiating transmission of electronic documents according to one embodiment of the present invention. Referring also to FIG. 10, there is shown an event trace diagram depicting a series of steps for remotely selecting and initiating transmission of electronic documents according to one embodiment of the present invention. User 101 interacts with remote device 109, which may be a remote computer, printer, fax machine, multifunction device, PDA, or any other device. Source PC 102 is a computer from which user 101 wishes to transmit a document to destination PC 113. Presumably, source PC 102 is the user's own computer, located at his or her home or office, although source PC 102 may be any computer, document storage appliance, server, or the like, which user 101 is authorized to access.

Remote device 109, source PC 102, and destination PC 113 may each be implemented as conventional personal computers, comprising a central processing unit, input and output device, and memory (not shown). In addition, source PC 102 includes or is connected to a document storage device 103, such as a hard drive, that contains documents organized according to a directory 108, as is known in the art. In one embodiment, remote device 109, source PC 102 and destination PC 113 each run an operating system such as Microsoft Windows XP® or Unix, including a graphical user interface for providing control functions and file management functions. Remote device 109, source PC 102, and destination PC 113 may also have other functionality and may run additional applications, such as for example word processing, e-mail, spreadsheet, and web browser applications.

It is understood that remote device 109, source PC 102, and destination PC 113 are connected to a network (not shown), such as the Internet, or a local area network (LAN) or wide area network (WAN), or the like, using known protocols and techniques for network communication and infrastructure. Accordingly, remote device 109, source PC 102, and destination PC 113 each include hardware and software for establishing and maintaining network connections using standard network protocols such as TCP/IP, ITTP, and SMTP as are known in the art. The present invention may be implemented on virtually any type of computer network, although for purposes of clarity the following description assumes that the network is capable of supporting and transmitting e-mail messages from one node to another.

In one embodiment, the functionality of the present invention is implemented as two software components. A remote device component, including user interface 110 and e-mail processing software 111, runs on remote device 109, and provides user interface capabilities and automatic e-mail generation capabilities. A PC component, comprising e-mail processing software 104, runs bilities. A PC component, comprising e-mail processing software 104, runs at source PC 102 and responds to requests from remote device 109. These software components may be preinstalled as part of an operating system installation, or may be installed at any time.

User 101 initiates a command on remote device 109 that requests a directory of documents from source PC 102. Remote device 109 generates and sends an e-mail message 105 to remote device 109. The e-mail message contains authentication information and a request for the directory data. In one embodiment, the user's request is transmitted to source PC 102 using a one-time pad or other secure method. As is known in the art, a one-time pad is a system in which a randomly generated private key is used only once to encrypt a message that is then decrypted by the receiver using a matching one-time pad and key.

Source PC 102 is configured to automatically process and respond to incoming e-mail messages that contain requests for directories and/or documents. In one embodiment, source PC 102 is preconfigured with e-mail processing software 104 that contains instructions for responding to such requests. In another embodiment, the operating system of source PC 102 includes functionality for dealing with such requests.

The present invention can be implemented using any PC 102 having some kind of functionality for receiving and sending e-mail (or some other transport mechanism). The particulars of PC's 102 network connectivity are irrelevant to the invention; thus, source PC 102 may be connected via a Ti line, digital subscriber line (DSL), cable modem, dial-up connection, or the like. In one embodiment, source PC 102 is on and connected constantly. In an alternative embodiment, source PC 102 may be configured to periodically turn itself on, and/or to check and service e-mail messages from devices 109 as described herein. Alternatively, a mail server (not shown) can be configured to turn on source PC 102 when it receives e-mail.

Source PC 102 receives e-mail message 105 and authenticates the user. One skilled in the art will recognize that such authentication may be performed using any known means, including for example password authentication, biometric authentication, or the like. Once the user has been authenticated, source PC 102 transmits, via e-mail, a representation 106 of directory 108 to remote device 109. Representation 106 may include entire directory 108, or a subset of directory 108, depending on the nature of the request and depending on how source PC 102 has been configured to make documents available in this manner. For example, user 101 may configure source PC 102 to only make certain files or subdirectories available via the techniques of the present invention. Those areas of directory 108 that are configured to be off-limits may be omitted from representation 106, or may be included in representation 106 but indicated as inaccessible (using a distinctive color, or icon, or some other designation).

In one embodiment, representation 106 contains meta-information for each document. Such meta-information may include, for example, the date of creation, date of last modification, author, application and version used in creating the document, size, and the like. Representation 106 may also contain document summaries, thumbnail images, or other abridged representations of documents that can assist a user in discerning the contents of documents without having access to the complete originals.

Remote device 109 presents representation 106 to user 101. In one embodiment, remote device 109 provides a user interface that permits navigation throughout the displayed representation 106. Thus, user 101 can look through the various documents, view meta-information, thumbnails, summaries, and the like, and select one or more documents he or wishes to transmit to destination 113. In another embodiment, remote device 109 provides a search mechanism that allows a user to enter keywords and/or parameters for meta-information, so as to more easily identify the document(s) of interest. For example, the user may search for documents having a certain combination of keywords and having a creation date that falls within a specified range. User interfaces for providing such search functionality are well known in the art, and are often included in file management functionality in conventional operating systems such as Microsoft Windows XP or the like. In the present invention, according to one embodiment, user 101 can use any desired combination of search functionality and directory navigation to locate and identify the document(s) of interest.

Once the desired document(s) have been identified, remote device 109 transmits e-mail message 112 to source PC 102 requesting that one or more documents be transmitted to destination 113. E-mail message 112 specifies the document(s) requested by user 101, and further specifies an address identifying destination 113. Message 112 may also specify a desired format (for example, a print-ready format such as a PDF file if destination 113 is a printer). In response to the message, source PC 102 retrieves the identified document(s) from storage 103, converts the retrieved document(s) to an appropriate format (if needed), encrypts the document(s), and transmits an e-mail message 107 to destination 113 including the encrypted documents) as an attachment. E-mail encryption and transport is accomplished, in one embodiment, using a product such as Encryption Plus E-mail Enterprise, an e-mail plug-in available from PC Guardian of San Rafael, Calif. One skilled in the art will recognize that any other e-mail encryption software can be used.

Upon receipt of e-mail message 107, destination 113 decrypts the attached document(s) and displays and/or prints the document(s) according to user instructions.

One skilled in the art will recognize that other transmission techniques besides e-mail messages can be used to send document retrieval request 105, directory information 106, and retrieved documents 107. E-mail messages are advantageous because they may be sent among remote device 109, source PC 102, and destination 113 even if a firewall is present; however, in alternative embodiments other transmission techniques may be used.

Figure 1B:
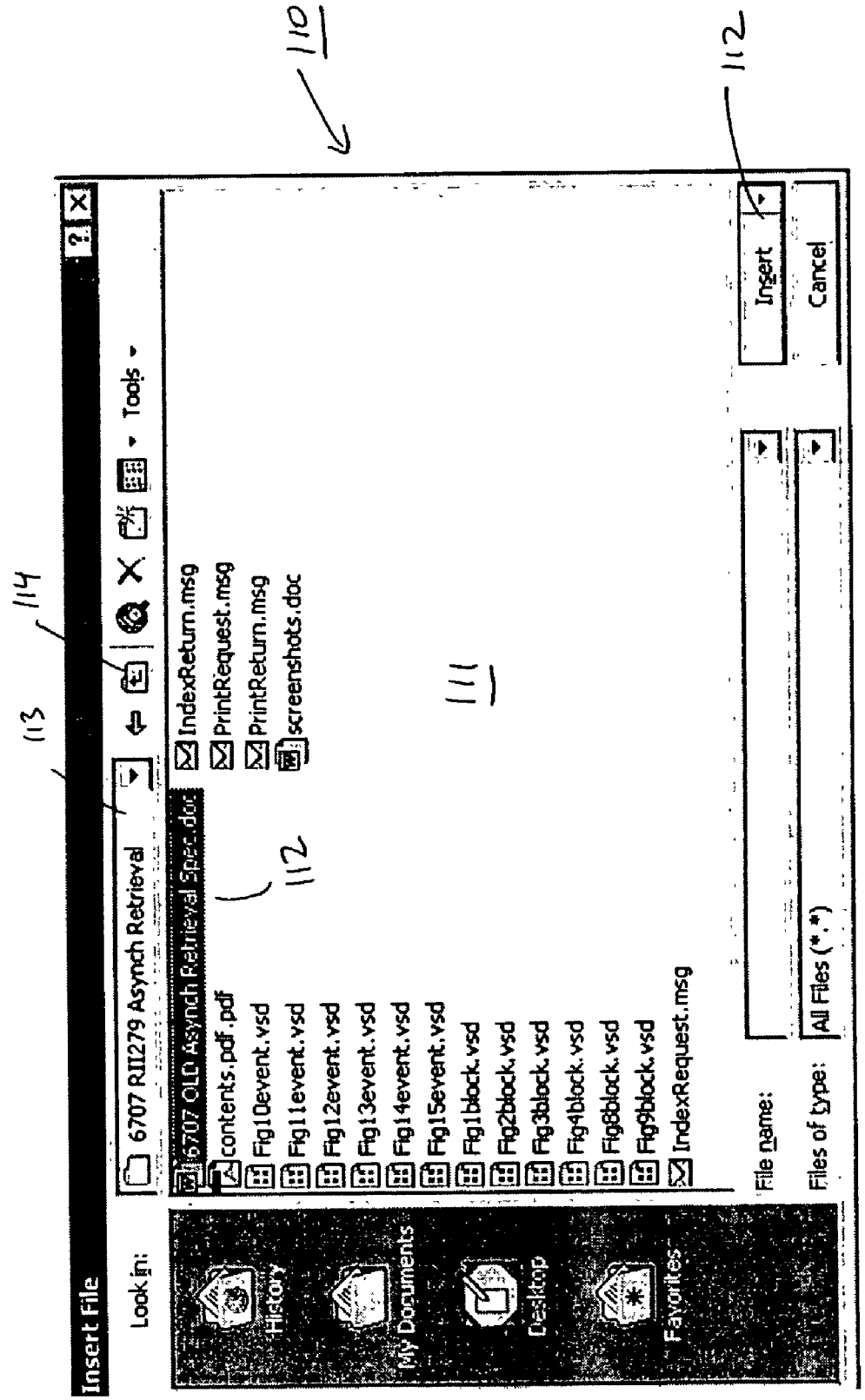
Figure 1C:
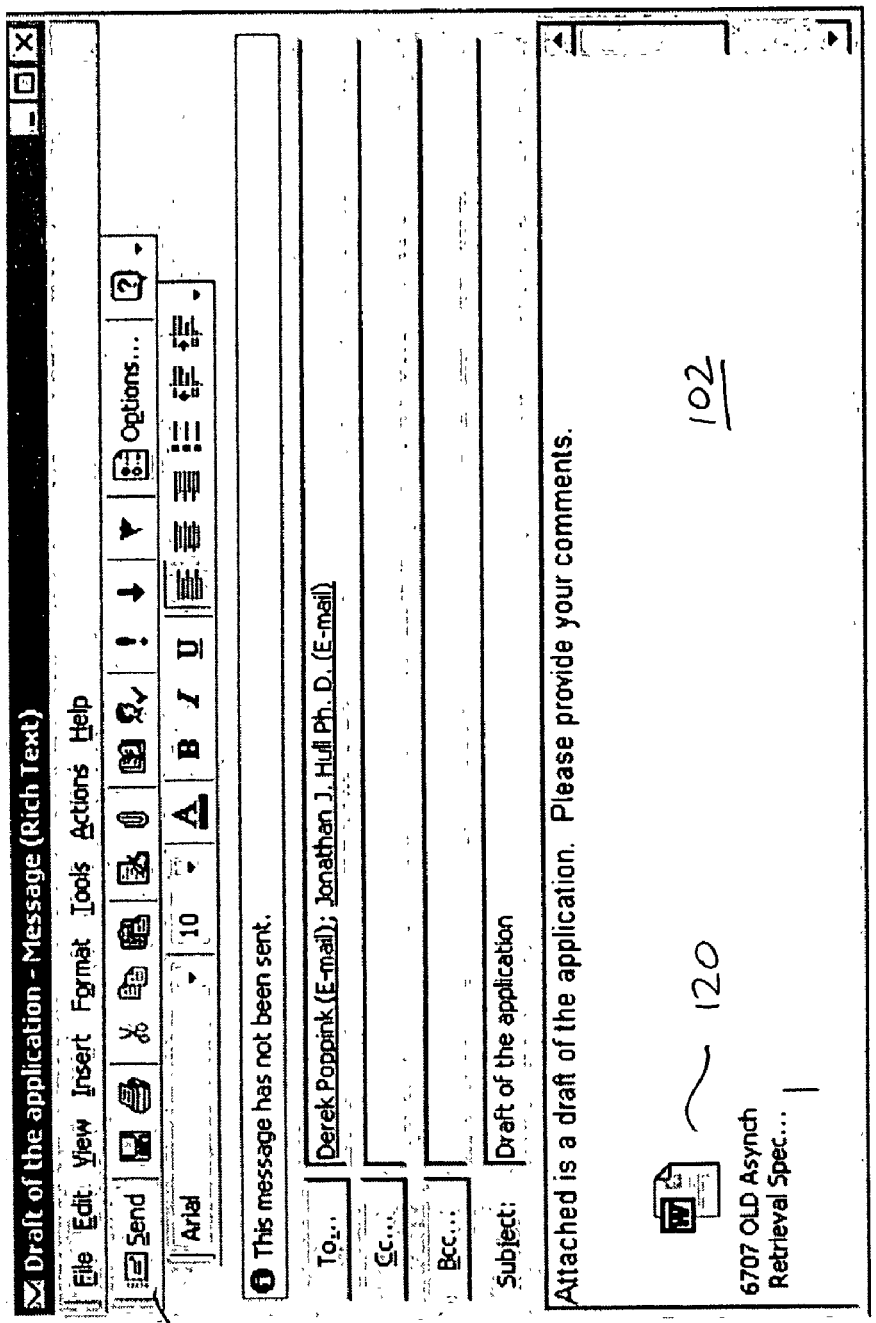

In an alternative embodiment, e-mail message 105 may contain more complex queries for directory information, or may contain any command that can be run at source PC 102 for generating a list of documents or files. For example, message 105 may include search parameters (such as keywords, file types, locations, and the like) for a document search on files stored in storage device 103. Upon receipt of message 105 and authentication of the user, source PC 102 runs the requested search. Source PC 102 transmits the results of the requested search back to remote device 109, in a similar manner as representation 106 is transmitted in FIG. 1. The requested search may extend to all files stored on device 103, or some subset thereof, or it may include other resources that are accessible by device 102 or remote device 109. Thus, the results of the search or other command may include documents that are located on other servers, computers, databases, bulletin boards, or devices; search results would then include full path information to enable remote device 109 to locate and retrieve documents from these other resources, either directly or via a network connection. In one embodiment, search results are provided as Uniform Resource Locators (URLs) so as to facilitate access to the referenced documents via an Internet connection.

Figure 3:
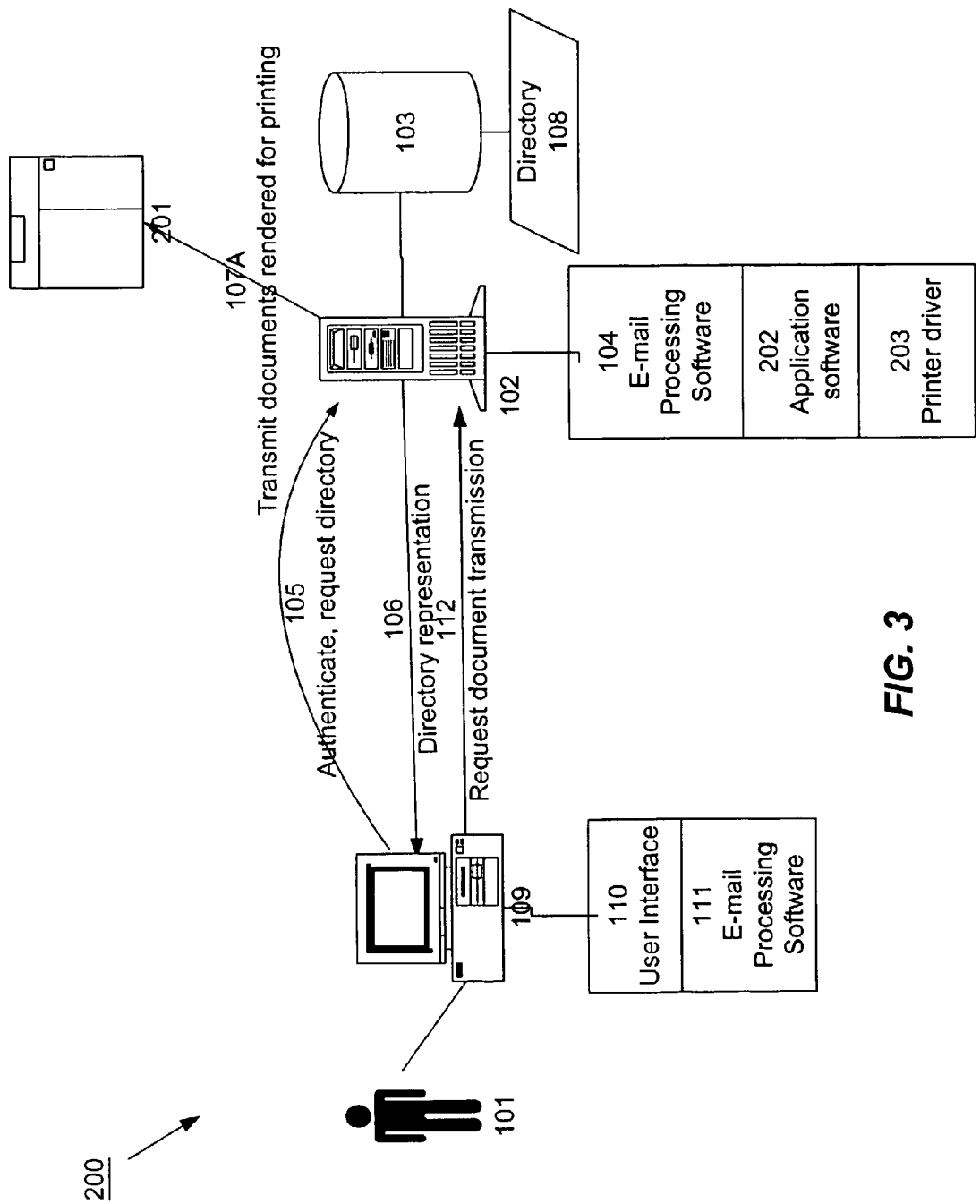
FIG. 3 is a block diagram depicting a system for remotely selecting and initiating transmission of electronic documents for printing according to the pre-sent invention.
Figure 12:
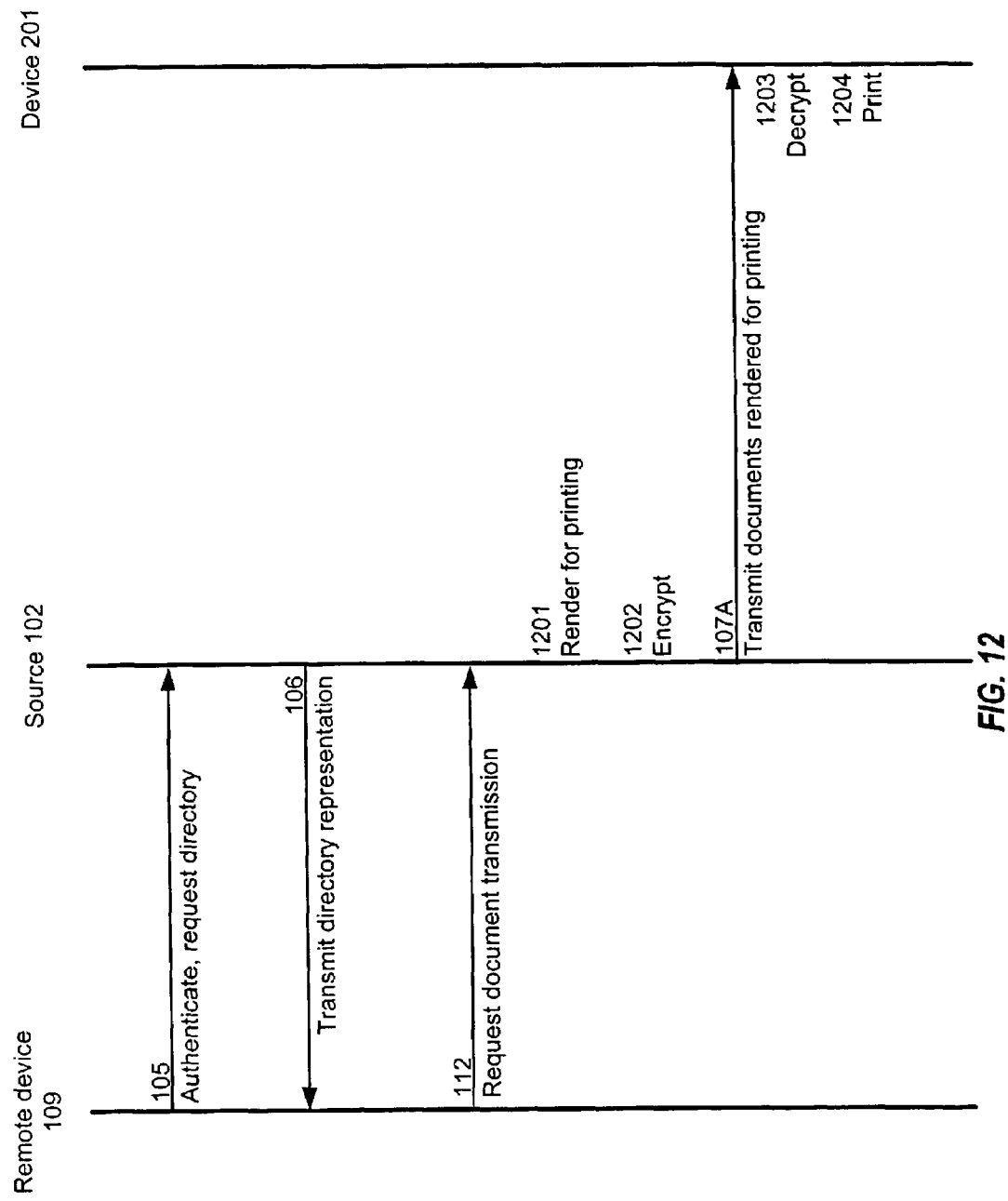
FIG. 12 is an event trace diagram depicting a series of steps for remotely selecting and initiating transmission of electronic documents for printing according to the present invention.

Referring now to FIG. 3, there is shown a block diagram depicting a system 200 for remotely selecting and initiating transmission of electronic documents to a printer or multi-function device 201 according to the present invention. Referring also to FIG. 12, there is shown an event trace diagram depicting a series of steps for remote retrieval as implemented using a printer or multifunction device according to the present invention. As shown in FIGS. 3 and 12, multifunction device 201 is shown in lieu of destination 113. In this implementation, user 101 selects and initiates transmission of documents from source PC 102 to device 201 by interacting with remote device 109. Device 201 is, in one example, a Grand World multifunction device as may be available from Ricoh Corporation. Alternatively, device 201 may be a conventional printer that is enhanced with additional controllers and software to provide user interface and network communication capability for connecting to a network and receive documents via e-mail. One skilled in the art will recognize that in alternative embodiments, device 201 may be any device that has output (such as printing) capability, user interface functionality, and network communication capability.

In the implementation shown in FIG. 3, it is assumed that user 101 is at a remote location with respect to source PC 102, and wishes to transmit a document from his or her PC 102 to device 201 for printing. User 101 initiates a command on remote device 109 that requests a directory of documents from source PC 102. As described above in connection with FIG. 2, remote device 109 generates and sends an e-mail message 105 to source PC 102. The e-mail message contains authentication information and a request for the directory data.

As described above, source PC 102 receives e-mail message 105 and authenticates the user. Once the user has been authenticated, source PC 102 transmits, via e-mail, a representation 106 of directory 108 (or a subset thereof) to remote device 109. Remote device 109 presents representation 106 to user 101. User 101 selects one or more documents he or wishes to transmit to device 201, and, in one embodiment, identifies device 201 via, for example, an e-mail address. Remote device 109 then transmits an e-mail message to source PC 102 specifying the document(s) requested by user 101, identifying the destination device 201, and further requesting that the document(s) be provided in a print-ready format. In response to the message, source PC 102 retrieves the identified document(s) from storage 103, converts (renders) 1201 the retrieved document(s) to a print-ready format using application software 202 and printer driver 203 suited to device 201, encrypts 1202 the document(s), and transmits an e-mail message 107A to device 201 including the encrypted document(s), already rendered for printing, as an attachment.

Upon receipt of e-mail message 107A, device 201 decrypts 1203 and prints 1204 the attached document(s). In one embodiment, the user can specify how many copies are to be printed, change the print size or paper source, or otherwise change the characteristics of the printing operation.

By using application software 202 and printer drivers 203 located on source PC 102 (or otherwise usable by source PC 102), the invention is able to provide print-ready versions of documents to device 201. Thus, the individual characteristics of the PC installation are utilized, and the appearance of the printed document is exactly the same as if the user had initiated the print job directly from source PC 102 in a conventional manner. For example, all font characteristics, application settings (such as hyphenation, for example), preferences, language packs, embedded images, and the like, are preserved.

Figure 4:
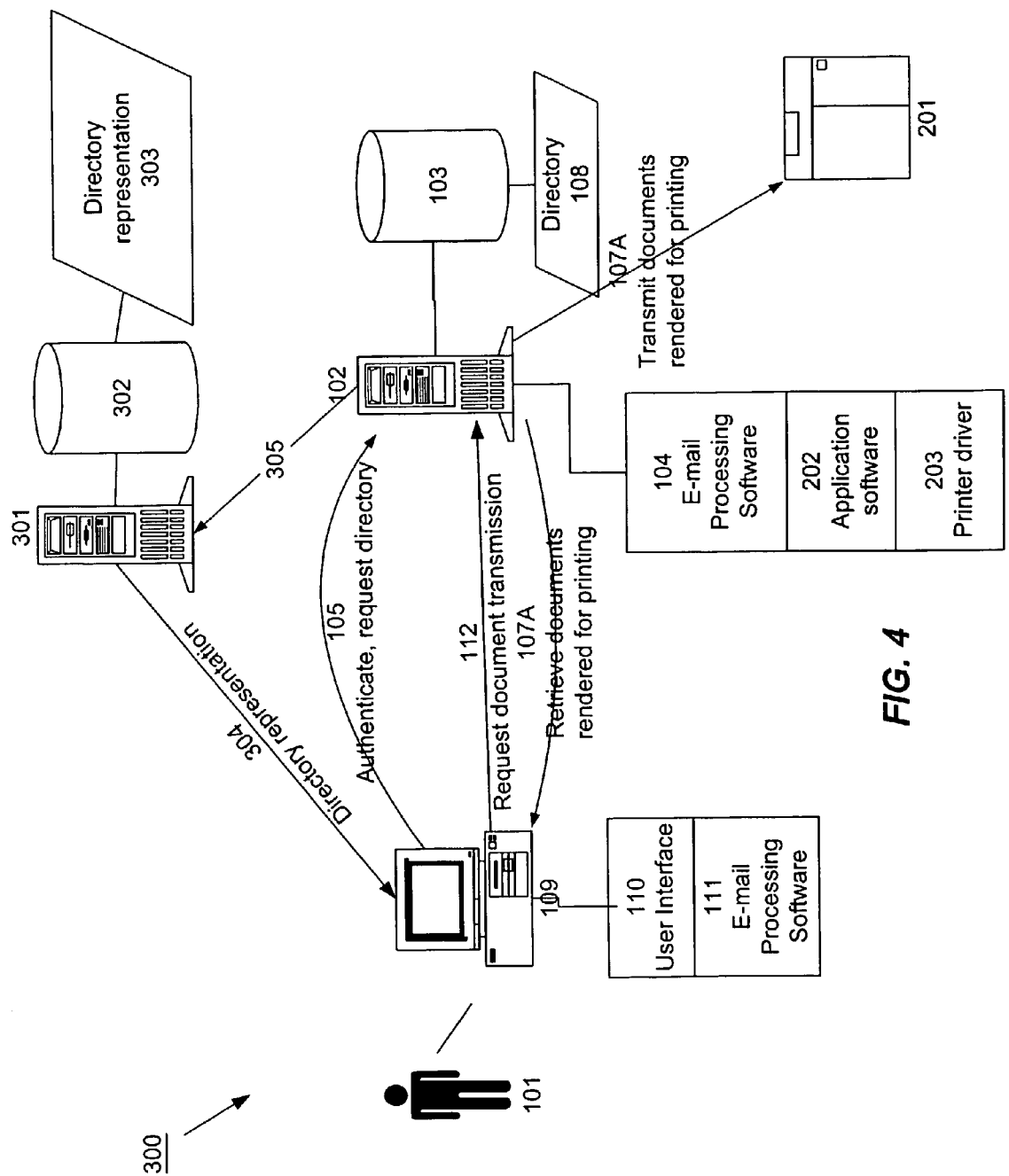
FIG. 4 is a block diagram depicting a system for remotely selecting and initiating transmission of electronic documents using a cached representation of a PC directory.
Figure 13:
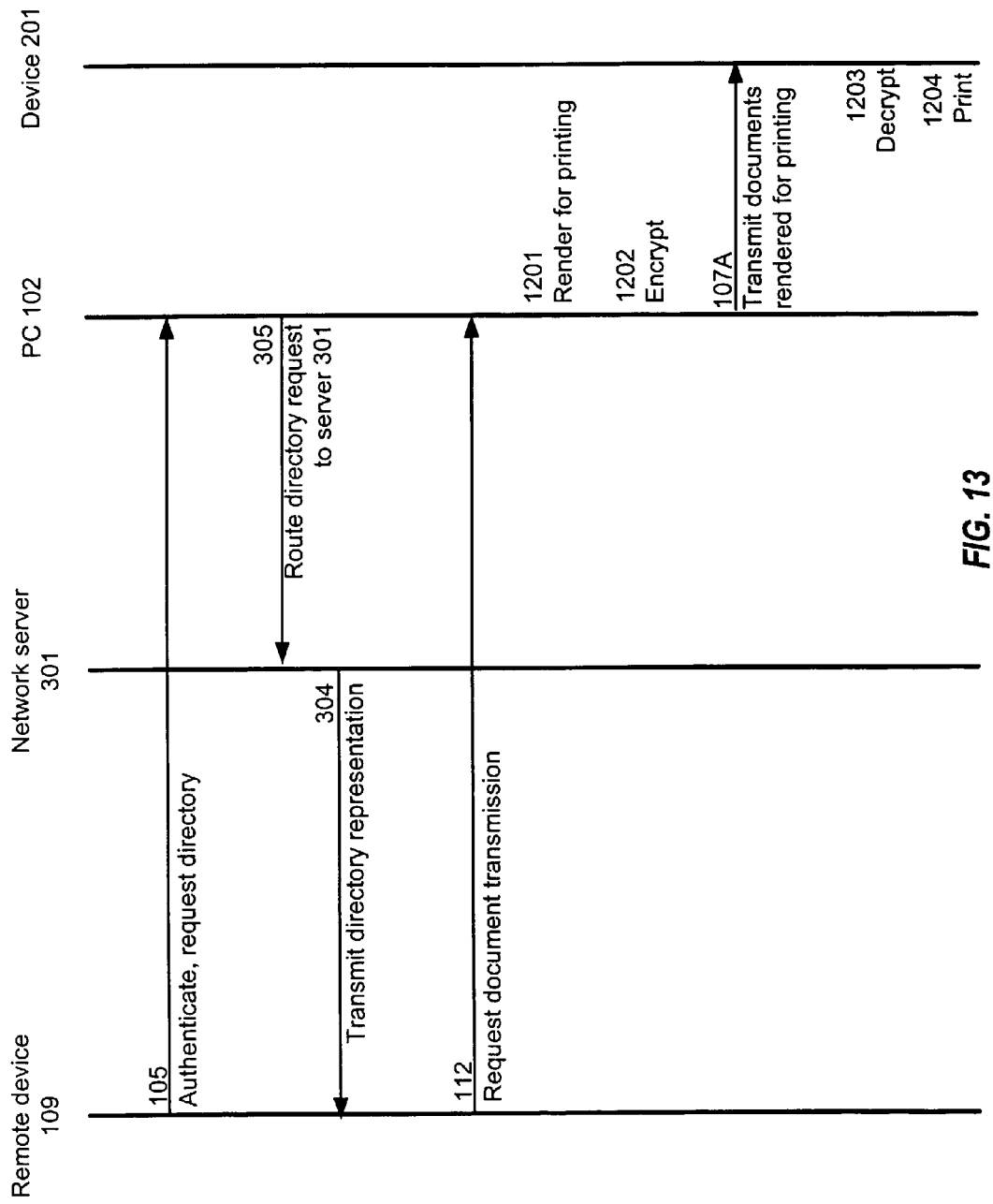
FIG. 13 is an event trace diagram depicting a series of steps for remotely selecting and initiating transmission of electronic documents using a cached representation of a PC directory.

Referring now to FIG. 4, there is shown an embodiment in which a representation 303 of directory 108 is stored in a cache 302 on a network server 301. Referring also to FIG. 13, there is shown an event trace diagram depicting a series of steps for remotely selecting and initiating transmission of electronic documents using a cached representation of a PC directory, assuming the representation of the PC directory has been previously stored on network server 301. When remote device 109 requests 105 directory information, the request is routed 305 to network server 301. In an alternative embodiment, remote device 109 requests directory information directly from server 301 rather than sending the request to source PC 102. Remote device 109 may obtain a uniform resource locator, IP address, or other identifier for server 301 in an initialization or setup step, or it may obtain such an identifier as part of a response to a previous request for a directory or documents.

Upon receipt of the request, network server 301 transmits 304 directory representation 303 to remote device 109. Thus, directory representation 303 can be made available to remote device 109 more quickly and without requiring source PC 102 to respond to directory requests. Freeing up source PC 102 from responding to such requests eases the burden on source PC 102 and provides improved response time.

Network server 301 can be located remotely with respect to source PC 102 and remote device 109. Server 301 may be implemented, for example, using a Document Mall device available from Ricoh Corporation, or any other network server device as is well known in the art. Subject to security limitations, server 301 may store directory representations 303 for any number of PCs 102 at any number of locations. In one embodiment, a directory representation 303 may be stored at remote device 109. Stored directory representations 303 may be updated periodically based on changes in directory configurations on source PC 102. For example, when changes occur, source PC 102 may send a message to any devices having stored directory representations 303, prompting the devices to update their representations 303 accordingly.

In an alternative embodiment, remote device 109 checks whether a current stored directory representation 303 is available, either locally or at an accessible device. If no representation 303 is available, or if the available representation 303 is not sufficiently up to date, source PC 102 retrieves directory 108 and provides it to remote device 109 in the manner described above in connection with FIG. 3.

Figure 8:
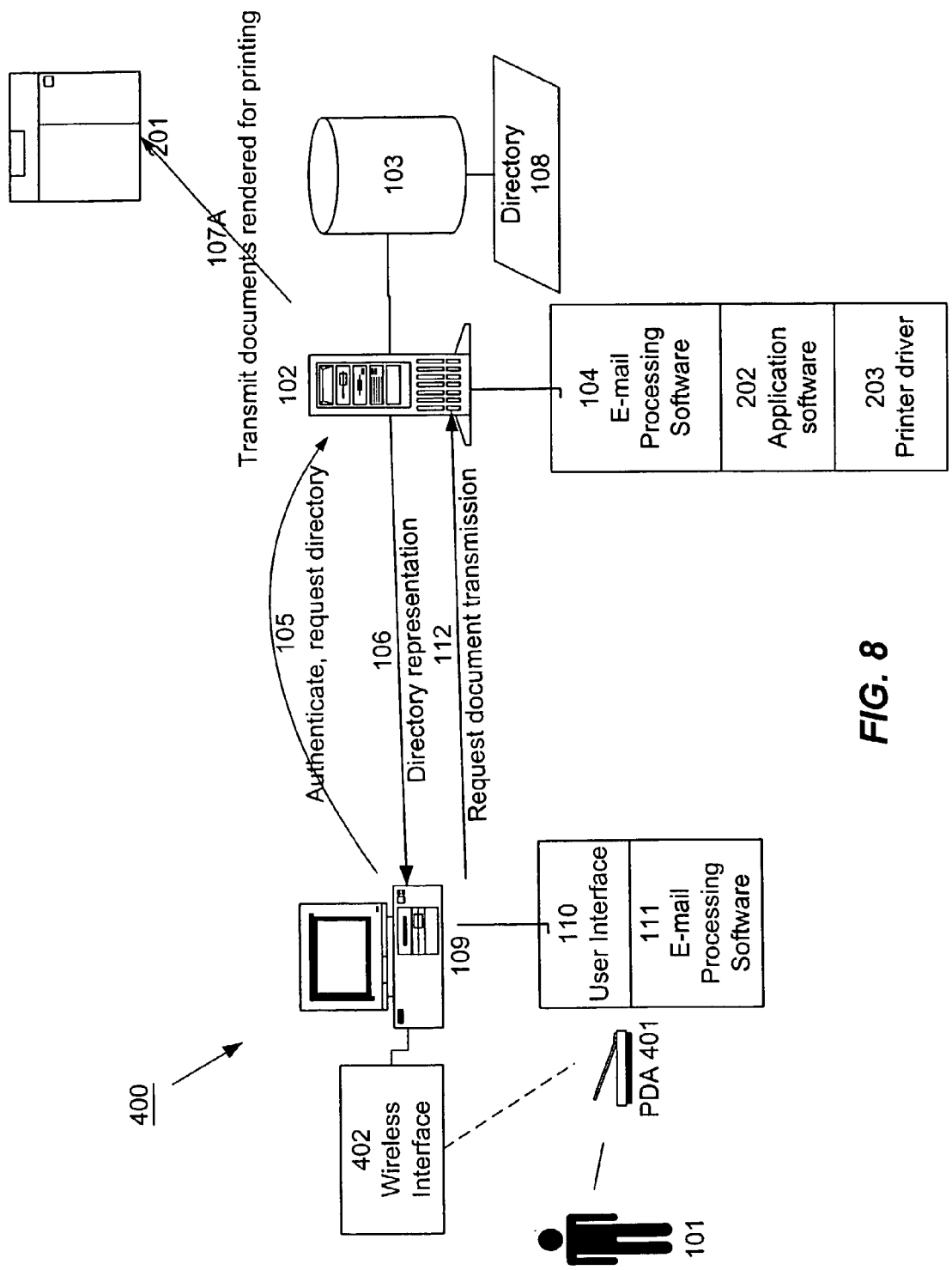
FIG. 8 is a block diagram depicting a system for remotely selecting and initiating transmission of electronic documents via a wireless device.

One skilled in the art will recognize that other variations on the above-described structures and methods of operation are possible. For example, referring now to FIG. 8, there is shown an embodiment wherein remote device 109 is equipped with a wireless interface 402, for example according to the 802.11b protocol. In such an arrangement, user 101 may interact with remote device 109 via a personal digital assistant (PDA) 401 that is capable of 802.11b wireless communications. Specifically, user 101 may navigate directories and select files, as described above, using the input and output components of PDA 401 that communicates via interface 402 with remote device 109. User 101 may thereby use the system of the present invention as a bridge between his or her PDA 401 and files stored in source PC 102.

Figure 9:
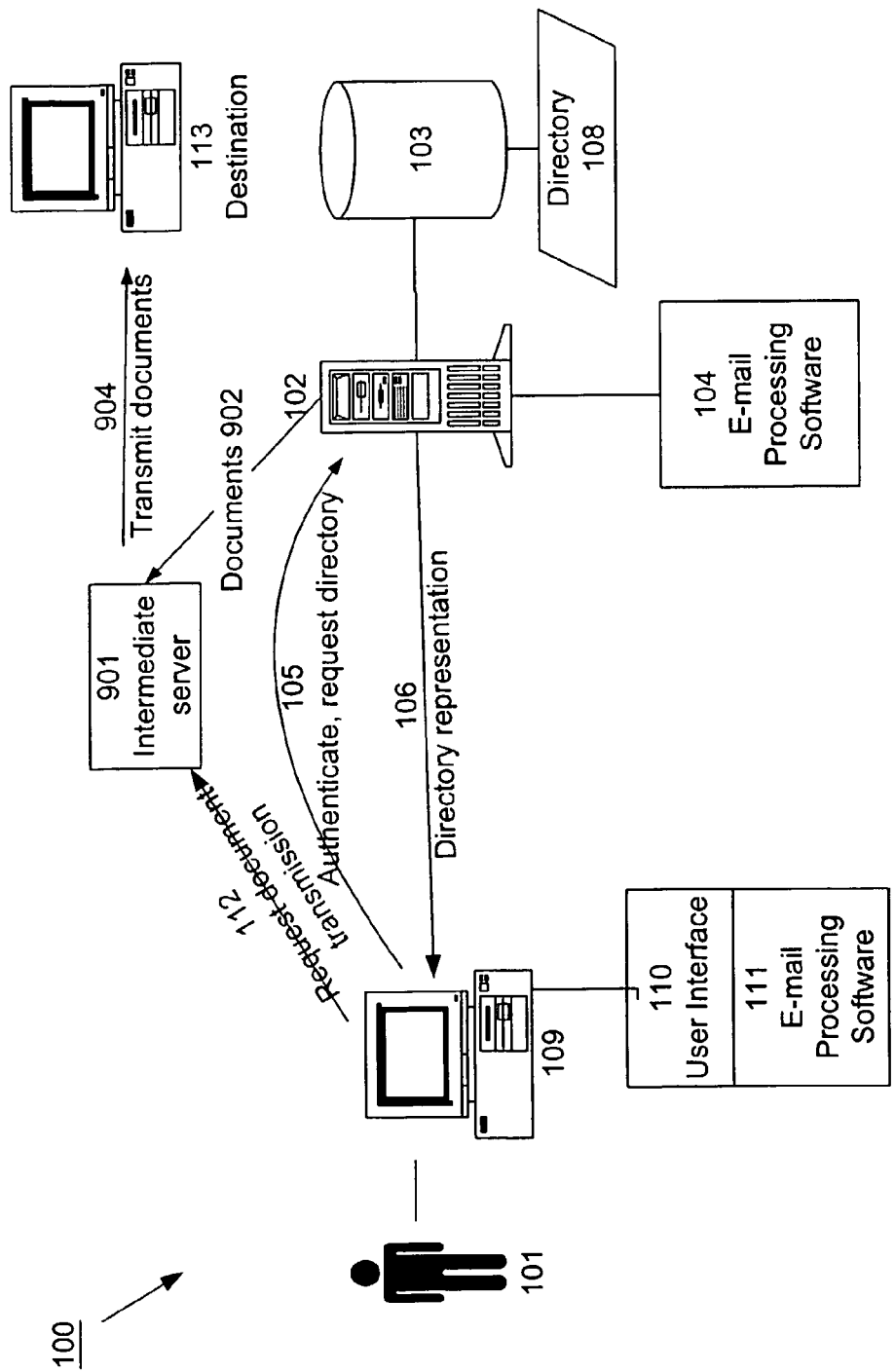
FIG. 9 is a block diagram depicting a system for remotely selecting and initiating transmission of electronic documents using an intermediate server according to the present invention.
Figure 11:
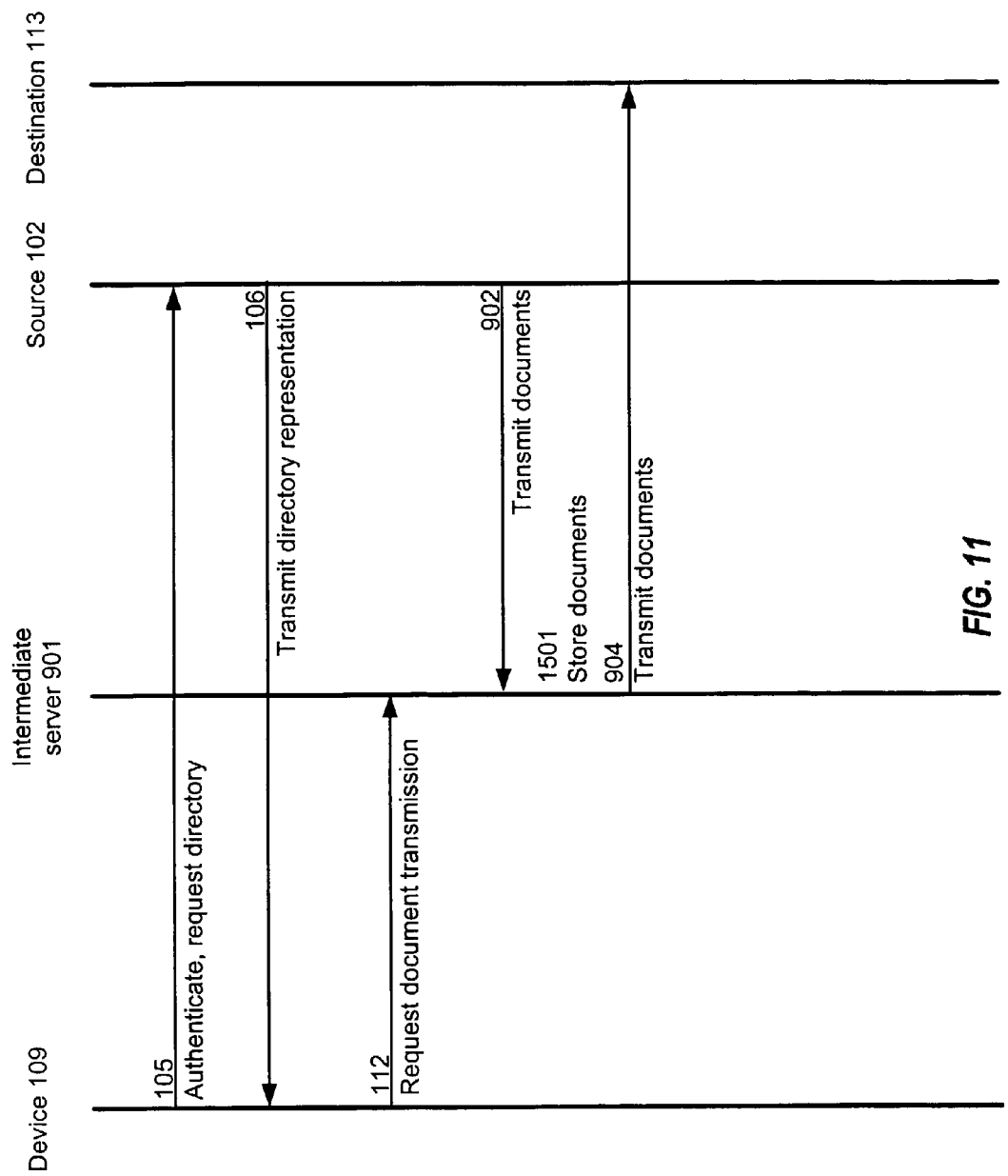
FIG. 11 is an event trace diagram depicting a series of steps for remotely selecting and initiating transmission of electronic documents using an intermediate server according to the present invention.

Referring now to FIG. 9, there is shown another alternative embodiment, wherein intermediate server 901 is used. The implementation depicted in FIG. 9 may be particularly useful in an environment such as a peer-to-peer network or running networked applications such as Lotus Notes or Microsoft Exchange. Server 901 may be a web server, bulletin board, or other repository or storage device. Referring also to FIG. 11, there is shown an event trace diagram depicting a series of steps for remote retrieval wherein intermediate server 901 is used. Whenever documents are requested (either by a directory request or a search request), source PC 102 provides the documents 902 to server 901, which stores 1501 the documents. Remote device 109 can then initiate transmission of the documents from server 901 to destination 113, thus avoiding excessively burdening source PC 102 with document requests. Other devices similar to 109 can also initiate transmission 904 of documents from server 901. In one embodiment, source PC 102 may provide remote device 109 with information for identifying the location or address of server 901. In one embodiment, the directory and/or documents are replicated automatically on server 901, either periodically or in response to a retrieval request so that the directory and/or documents will be available more quickly if requested again in the future. Directory and/or documents may be deleted from server 901 after a predetermined time period or after some period of nonuse.

Software Implementation

As described above, the invention may be implemented using software components 110, 111, and 104. Software components 110 and 111 are installed on remote device 109, and software component 104 is installed on source PC 102. In one embodiment, additional software may be installed on destination 113, if automated processing of received documents (for example, for printing) is desired.

E-mail processing software 104, installed on source PC 102, recognizes directory information requests and document requests from remote device 109, authenticates user 101 as appropriate, and responds to the received requests automatically with directory representations 106 or by transmitting (encrypted) retrieved documents 107 or 107A to destination 113 or 201. Software 104 renders a document for printing using application software 202 and printer driver 203 as needed, according to the received request for a document. Finally, software 104 can be configured to periodically and automatically search for and retrieve updated printer drivers 203 from servers providing such information, according to techniques that are well known in the art.

User interface 110 provides input and output functions at remote device 109 or 201, allowing user 101 to log in and navigate among directories, request transmission of files, specify print characteristics, and the like. Software 111 generates e-mail requests for directory information and documents, and receives and processes e-mail responses received from device 102. Thus, in response to a user requesting directory information or a document, software 111 generates and sends an e-mail request identifying the directory or file and the remote device 109 from which the request was made.

Software 111 can be implemented using any readily available e-mail system. Software 111 can automatically generate e-mail requests using a Compose window from within an e-mail system. Software 111 automatically decrypts directory representations and received documents; functionality for automatic decryption of such items may be implemented, for example as a Java program that can be downloaded as needed at runtime.

In another embodiment, user interface 110 and software 111 can be implemented using a pre-installed plug-in, or built-in operating system functionality. One skilled in the art will recognize that many different mechanisms are possible for installing and implementing the user interface and e-mail processing capability of the present invention.

Directory representation 106 can be provided according to any desired format that is understandable by software 111. In one embodiment, source PC 102 generates representation 106 in JavaScript or in extended markup language (XML), and user interface 110 provides functionality for browsing the directory representation 106 according to conventional mechanisms. The JavaScript or XML version of directory representation 106 is, in one embodiment, generated by software 104 from conventional hierarchical directory data as may be provided by an operating system such as Microsoft Windows. For example, in one embodiment, source PC 102 generates directory representation 106 by navigating the file tree of a conventional hierarchical file system. Starting at a folder, source PC 102 lists all the items in that folder. If an item is a subfolder, source PC 102 executes the same process on that subfolder. Algorithmic techniques for such traversal of a file system are well known.

As described previously, in one embodiment, representation 106 contains meta-information for each document. Such meta-information may include, for example, the date of creation, date of last modification, author, application and version used in creating the document, size, and the like. Representation 106 may also contain document summaries, thumbnail images, or other abridged representations of documents that can assist a user in discerning the contents of documents without having access to the complete originals. User interface 110 interprets and presents such meta-information, summaries, thumbnails, and the like, and displays these information items for user 101, as user 101 navigates through the directory.

In one embodiment, e-mail processing software 104 is implemented as an operating system plug-in, such as a Windows service, that is pre-installed on source PC 102 according to techniques that are well known in the art. In one embodiment, installation includes printer drivers 203 for any devices 201 connected to source PC 102 over a network, or to which source PC 102 has access. Drivers 203 can periodically be updated or added as needed, via automated or user-initiated download, or via any other means. Including printer drivers 203 in the installation ensures that source PC 102 is able to generate document versions that are print-ready at device 201.

Software 104 periodically polls an e-mail server (not shown) associated with source PC 102 to determine whether there are any new e-mail messages requesting directory representations or documents. Such polling may be performed using known functional capabilities of e-mail clients such as, for example, Microsoft Outlook, or it can be programmed as a function of software 104 so as to be independent of any particular e-mail client software application.

User Interface

Figure 5:
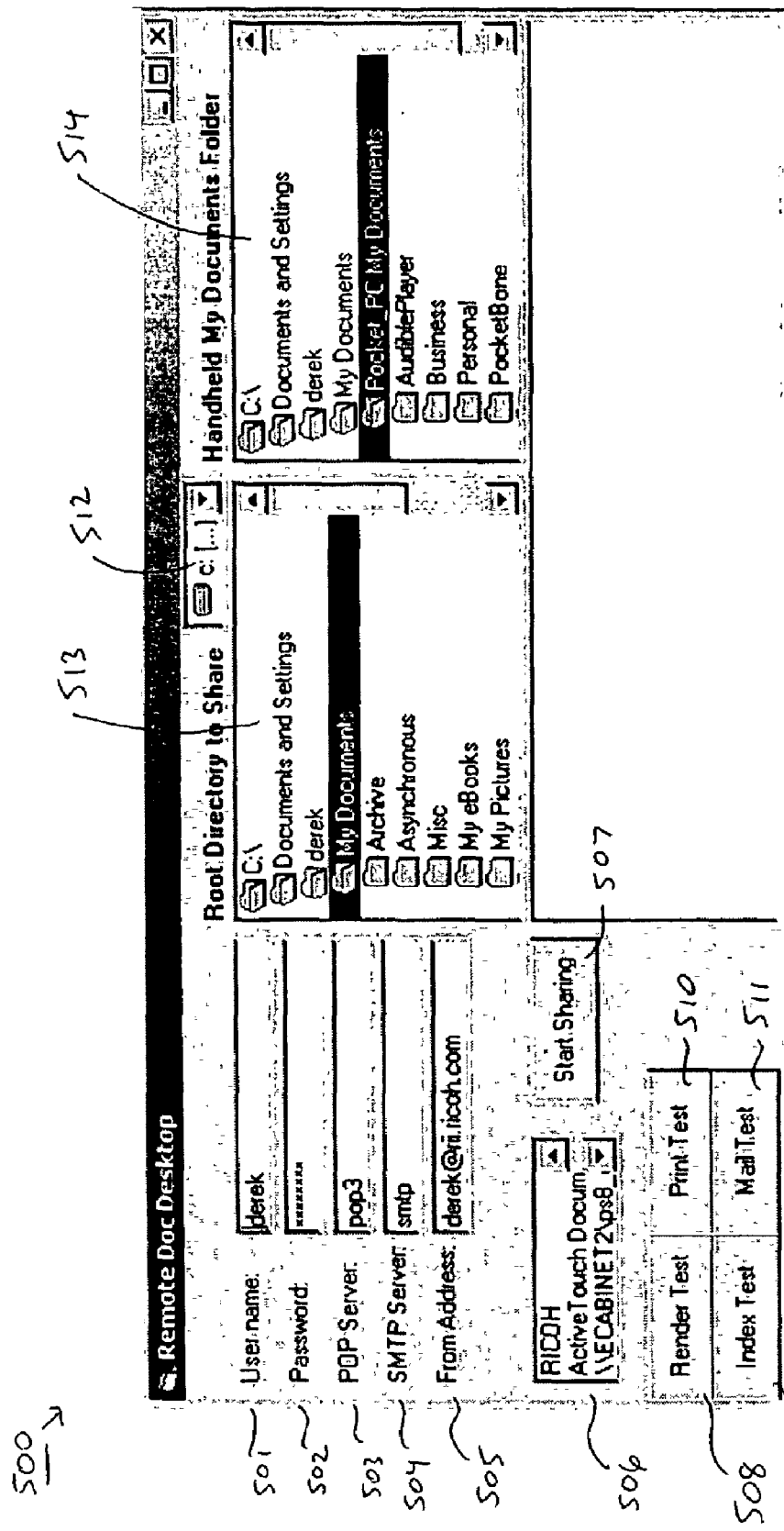
FIG. 5 is a screen shot depicting an example of a user interface for a source PC-based software component according to one embodiment.

Referring now to FIG. 5, there is shown a screen shot depicting an example of a user interface window 500 for a PC-based software component according to one embodiment. Window 500 may be displayed on a display screen of source PC 102. Window 500 includes a number of user interface elements for configuring source PC 102 to respond to requests for directory information and documents in order to facilitate remote access as described above, and for specifying various parameters and limitations on the remote access. User 101 may control the various elements of window 500 using conventional input devices, such as a keyboard, mouse, touch-screen, or the like. Thus, user 101 would activate screen 500 as part of the set-up operation for initially configuring access to source PC 102, or for changing the parameters of such access. Screen 500 may automatically appear upon installation of the PC-based software component of the present invention, so as to enable initial configuration. In one embodiment, user 101 can launch screen 500 only upon verification of login credentials; in this manner, unauthorized users are deterred from changing the parameters of remote access.

User name field 501 and password field 502 allow user 101 to specify the login credentials that will allow access to documents stored on source PC 102. POP server field 503, SMTP server field 504, and from address field 505 specify the e-mail parameters for communication with source PC 102. Device list 506 provides a scrollable list of devices from which user 101 might wish to access documents on source PC 102. User 101 can select particular devices from list 506, so that only requests from those devices will be honored. Alternatively, user 101 can specify that any authenticated request from any device be honored. Start sharing button 507 activates sharing of files stored on source PC 102 in accordance with the parameters specified in screen 500. Thus, once user 101 has clicked on start sharing button 507, software 104 will begin responding automatically to authenticated requests for directory information or documents. In one embodiment, once user 101 has clicked on start sharing button 507, the button changes to a stop sharing button (not shown).

Test buttons 508 through 511 initiate tests of various functions of software 104, including a test of print rendering 508, a test of printing 510, a test of directory information transmission 509, and a test of mail functionality 511.

Window 513 allows user 101 to specify which directories are to be made available via the functionality of the present invention. Multiple selections are possible. In one embodiment, only those files residing within the selected folders will be transmitted by software 104, and files residing in other folders cannot be accessed remotely using the functionality of the present invention. In addition, in one embodiment, only the directory information for selected folders will be transmitted in response to requests for directory information. Drive selection popup menu 512 allows user 101 to specify which drive or other resource is shown in window 513.

Window 514 allows user 101 to specify directories in an auxiliary device that can be uploaded and/or made available via the functionality of the pre-sent invention. As with window 513, multiple selections are possible.

Figure 6:
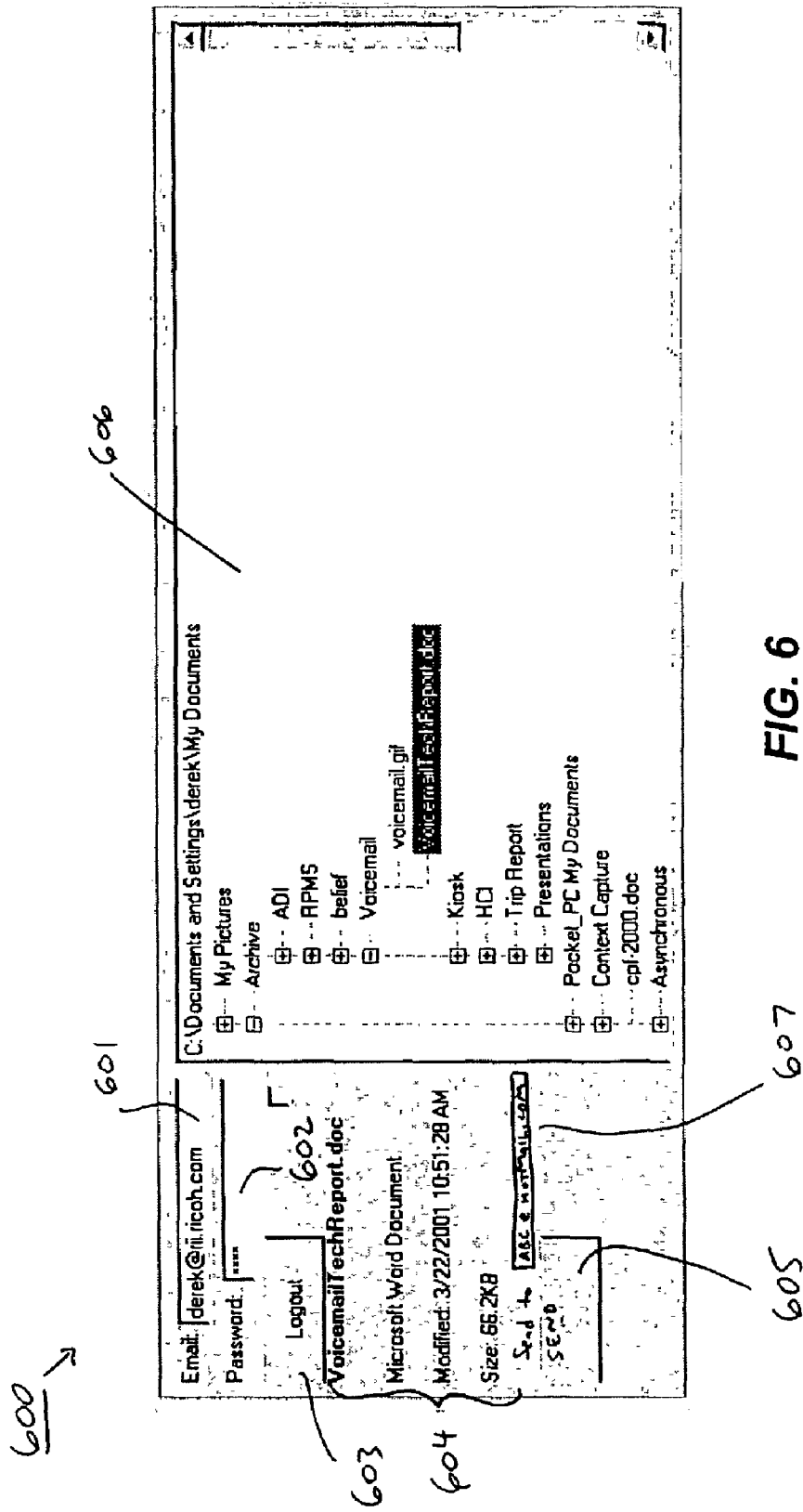
FIG. 6 is a screen shot depicting an example of a user interface for a remote device-based software component according to one embodiment.

Referring now to FIG. 6, there is shown a screen shot depicting an example of a user interface window 600 for a remote device-based software component according to one embodiment. Window 600 may be displayed on a display screen of remote device 109, in order to provide user 101 with access to documents on his or her PC 102 for transmission to destination 113. Window 600 includes a number of user interface elements for navigating and selecting files for retrieval, and for providing authentication information. User 101 may control the various elements of window 600 using conventional input devices, such as a keyboard, mouse, touch-screen, or the like.

E-mail field 601 accepts user input specifying an e-mail address. This e-mail address serves as an identifier of source PC 102, so that remote device 109 sends requests for directory information to the specified address. E-mail field 607 accepts user input specifying a destination e-mail address. This e-mail address servers as an identifier of destination 113, so that source PC 102 sends documents to the specified address. In an alternative embodiment, remote device 109 may store associations between user identifiers and e-mail addresses, so that user 101 may provide an identifier (or select from a number of on-screen choices), and remote device 109 can then look up the corresponding e-mail address. In another alternative embodiment, remote device 109 may store a history of previously entered e-mail addresses, and may present these as selections in an on-screen menu, so that user 101 can specify an e-mail address without having to type it in. In yet another embodiment, transmission of requests for directory information and documents may be accomplished by some mechanism other than e-mail, so that fields 601 and 607 might be replaced by some other fields for identifying source PC 102 and destination 113.

Password field 602 accepts user input of a password for authentication purposes. The entered password is compared against a previously stored password; if the entered password fails to match, access to directory information or documents is denied. In alternative embodiments, other authentication methods may be used. For example, a thumbprint scanner, retinal scanner, or smart card reader may be attached to remote device 109; user 101 provides the appropriate biometric data or magnetic card in order to proceed.

Once user 101 has provided his or her e-mail address in field 601 and password in field 602, he or she clicks on an enter button or login button (not shown). Remote device 109 generates and transmits a directory request 105, including the entered authentication information, to source PC 102, according to the techniques described above. Upon receipt of directory representation 106, directory 606 is displayed. In the example shown in FIG. 6, directory 606 is pre-sented as a hierarchical, dynamic, navigable input/output element. User 101 can selectively expand or collapse folders, and can select one or more items within directory 606. In one embodiment, metadata 604 is displayed for items selected by user 101.

User 101 can specify that a selected item be transmitted to destination 113 by clicking on send button 605. One skilled in the art will recognize that screen 600 may include any number of buttons for initiating other actions that may be performed with respect to selected documents. For example, a display button may cause the selected item to be displayed, or previewed, on the screen of remote device 109.

Once user 101 clicks on send button 605 (or another button specifying an action), remote device 109 generates and transmits an e-mail message to source PC 102, requesting that the selected document be transmitted. The document is retrieved, formatted, encrypted, and transmitted to destination 113, according to techniques described above. Once the document is received at destination 113, destination 113 may perform a specified action. For example, if destination 113 is a printer, and user 101 requested that the selected document be printed, destination 113 prints the document.

The process of transmitting and receiving requests for directory information and documents, and authenticating user's 101 login credentials, is invisible to user 101. Thus, from user's 101 point of view, transmitting (or otherwise accessing) a document to destination 113 is as simple as selecting the document from a displayed directory and clicking on a button to perform the desired action.

Figures 7A, 7B:
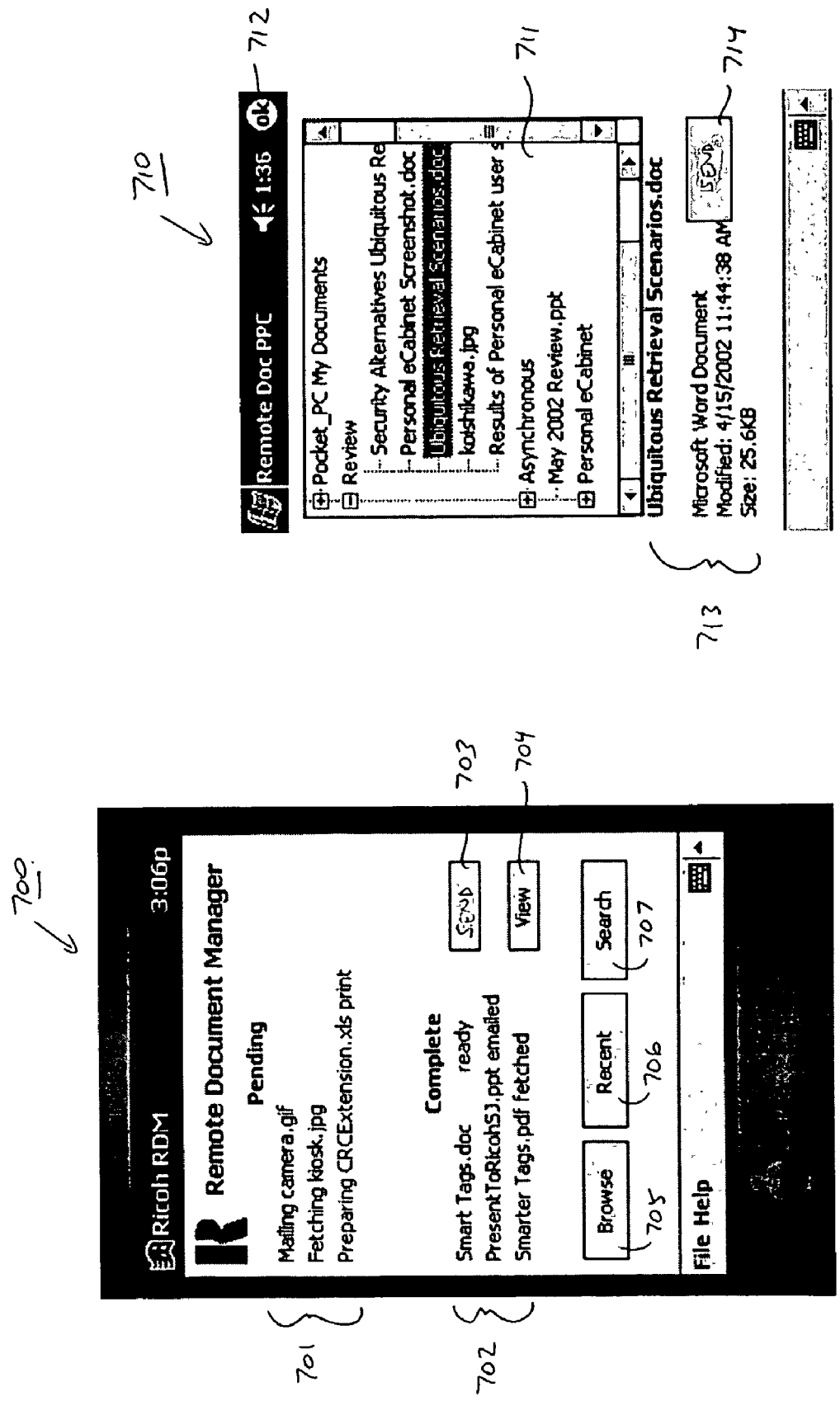
FIGS. 7A and 7B are screen shots depicting an example of a user interface for a PDA-based software component according to one embodiment.

Referring now to FIGS. 7A and 7B, there are shown screen shots depicting examples of user interface screens 700 and 710, respectively, for a PDA-based software component according to one embodiment. As described above in connection with FIG. 8, the invention can implemented using a PDA 401 having a wireless interface 402 for communicating with remote device 109, and allowing user 101 to select and initiate transmission of files from source PC 102 to device 201 for printing or other action.

Screen 700 includes a list 701 of documents for which some action is pending, including previously requested actions such as transmitting, receiving, or processing various documents. In one embodiment, user 101 can click on an item, or on an on-screen button or menu command, to view more details as to the status of the pending action, or to modify or cancel the item.

Screen 700 also includes a list 702 of documents for which some action has been completed. For documents available to be printed, a send button 703 is provided; user 101 can click on send button 703 to initiate transmission of a file to device 201. For documents available to be viewed on-screen, a view button 704 is provided; user 101 can click on view button 704 and the document is presented on the display screen of PDA 401 (or on some other device). Additional action buttons may be provided for other completed action items and documents, depending on the type of action that is appropriate for the document. Examples of such additional buttons include: delete, print, edit, forward, reply, and the like. In an alternative embodiment, other user interface elements may be provided instead of buttons; for example, a context-sensitive pop-up menu may be provided for selecting an action to be performed in connection with a document.

Browse button 705 activates browsing screen 710. In one embodiment, screen 710 is presented alongside or overlapping screen 700; in another embodiment, screen 710 replaces screen 700. Screen 710 includes window 711 that pre-sents the selected directory as a hierarchical, dynamic, navigable input/output element, similar to directory representation 606 discussed above in connection with FIG. 6. As described above, user 101 can selectively expand or collapse folders, and can select one or more items within directory 606. When a document is selected, information 713 describing the document is displayed, including for example the document type, date of creation, size, and the like. Send button 714 initiates transmission of the document to device 201. OK button 712 dismisses window 711 and returns the user to screen 700.

Recent button 706 causes PDA 401 to display a list of recently accessed directories or documents. Search button 707 activates a search function; user is prompted to enter one or more search terms, and PDA 401 presents a list of matching documents from retrieved directories associated with user 101.

The user interface for PDA 401 may, in one embodiment, further include screens and commands for authenticating the user, configuring device 201, deleting previously retrieved documents and action items, and the like.

E-Mail Formats

In one embodiment, as described above, the present invention employs e-mail as a transport mechanism for various requests and responses for directory information and for documents. The following are examples of e-mail formats for a directory information request, a directory information transmittal, a document transmission request, and a print-ready document transmittal. As described above, the various components of the invention are configured to generate and respond to e-mails according to these formats. One skilled in the art will recognize that the following e-mail formats are merely exemplary, and that any other format may instead be used.

Directory Information Request: <IndexRequest>
Subject: <IndexRequest>
From: e-mail address of requesting device
To: e-mail address of PC having requested directory
Body of message: blank
Attachment: none
Directory Information Transmittal: <IndexReturn>
Subject: <IndexReturn>
From: e-mail address of PC having requested directory
To: e-mail address of requesting device
Body of message: blank
Attachment: text file entitled "remdocindex.txt", formatted as follows:
first line: path to directory
remaining lines: list of files in directory, including meta-information Each line of the file list in remdocindex.txt is formatted as follows: filename?path?date-modified?file-type?size (where path indicates the path within the requested directory. An example of a portion of remdocindex.txt is shown below:

C:\Documents and Settings\derek\My Documents
Sample.jpg?My Pictures\?Jun. 16, 2000 1:58:12 AM?JPEG Image?9894
product.jpg?My Pictures\?Jun. 29, 2000 4:00:42 PM?JPEG Image?4883
product gif?My Pictures\?Jun. 29, 2000 4:03:52 PM?GIF Image?6086
tn_email.jpg?My Pictures\?Jun. 29, 2000 4:04:50 PM?JPEG Image?7854
papers.gif?My Pictures\?Jul. 5, 2000 1:32:28 PM?GIF Image?1494
Authors.doc?Misc\?Jul. 17, 2000 5:56:28 PM?Microsoft Word Document?70144
Progress.txt?Misc\?Jun. 29, 2000 1:30:20 PM?Text Document?469
Retrieval.doc?Unconscious\Brainstorming\?Sep. 26, 2000 11:22:02 AM?Microsoft Word Document?24064
Schedule for the next two weeks.doc?Misc\?Aug. 31, 2000 4:15:24 PM?Microsoft Word Document?19456
Transmission Request: <TransmitRe quest>
Subject <TransmitRequest>
From: e-mail address of requesting device
To: e-mail address of PC having requested document
Body of message: document's filename, including path (example: C:\Documents and Settings\derek\My Documents\Dereks Next Projects.doc), and e-mail address of destination
Attachment: none
Print-Ready Document Transmittal: <PrintReturn>
Subject <PrintReturn>
From: e-mail address of PC having requested document
To: destination e-mail address
Body of message: blank
Attachment: document, in print-ready format (such as PostScript)

One skilled in the art will recognize that other user interface arrangements and configurations may be implemented without departing from the essential characteristics of the present invention, and that the particular layout and features depicted in the above-described user interface screens are merely exemplary. As can be seen from the above examples, the present invention provides techniques for securely and remotely selecting and initiating transmission of stored electronic documents from a source PC (or other device) to a destination. As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for remotely selecting and initiating transmission of an electronic document, comprising:
   receiving at a source device from a remote device a first electronic mail message comprising a first request command for a graphical representation of a directory of documents stored on the source device;
   responsive to the received first message
      traversing the directory of the source device to generate a graphical representation of the directory; and
      transmitting from the source device to the remote device a second electronic mail message comprising the graphical representation of the directory, the graphical representation navigable on a user interface of the remote device;
   receiving at the source device from the remote device a third electronic mail message comprising a second request command to transmit at least one of the documents stored on the source device to an intermediate server; and
   responsive to the received third message, transmitting from the intermediate server source device to at least one destination device a fourth electronic mail message comprising the requested at least one of the documents stored on the source device.

2. The method of claim 1, wherein the remote device comprises one selected from the group consisting of:
   a personal computer;
   a printer;
   a fax machine; and
   a multifunction device.

3. The method of claim 1, wherein:
   receiving the first and third electronic mail messages comprise receiving the messages across a firewall; and
   transmitting the second and fourth electronic mail messages comprise transmitting the messages across a firewall.

4. The method of claim 1, wherein the plurality of stored documents comprises documents stored on a hard drive, the method further comprising:
   prior to transmitting the fourth electronic mail message, retrieving the requested at least one stored document from the hard drive.

5. The method of claim 1, further comprising:
   prior to transmitting the second electronic mail message, authenticating a user initiating the directory request.

6. The method of claim 1, further comprising:
   prior to transmitting the fourth electronic mail message, authenticating a user initiating the document request.

7. The method of claim 1, wherein the at least one stored document is stored in a first format, the method further comprising:
   prior to transmitting the fourth electronic mail message, converting the requested at least one of the documents stored on the source device to a second format.

8. The method of claim 7, wherein converting the requested at least one of the documents stored on the source device to the second format comprises:
   rendering the requested at least one of the documents stored on the source device in a print-ready format.

9. The method of claim 1, wherein transmitting the second electronic mail message comprises:
   encrypting the directory; and
   transmitting an electronic mail message containing the encrypted directory.

10. The method of claim 1, wherein transmitting the fourth electronic mail message comprises:
    encrypting the requested at least one of the documents stored on the source device; and
    transmitting an electronic mail message containing the encrypted at least one of the documents stored on the source device.

11. The method of claim 1, wherein the second electronic mail message further contains meta-information describing the at least one of the documents stored on the source device.

12. A computer-implemented method for remotely selecting and initiating transmission of an electronic document, comprising:
    receiving at a source device from a remote device a first electronic mail message containing a first request command for a directory describing a plurality of stored documents on the source device;
    responsive to the received first message:
       traversing the directory of the source device to generate a graphical representation of the directory;
       determining at the source device a portion of the requested directory describing the plurality of stored documents that has been designated by a user of the source computer for remote access; and
       transmitting from the source device to the remote device a second electronic mail message containing the graphical representation of the directory and information indicating the portion of the requested directory designated for remote access;
    receiving at the source device from the remote device a third electronic mail message containing a second request command to transmit at least one of the stored documents to an intermediate server; and
    responsive to the received third message, and responsive to the requested at least one stored document being designated for remote access, transmitting from the source device intermediate server to at least one destination device a fourth electronic mail message containing the requested at least one stored document to the remote device.

13. The method of claim 12, wherein the source device comprises a personal computer.

14. The method of claim 12, wherein:
transmitting the first and third electronic mail messages comprise transmitting the messages across a firewall; and
receiving the second electronic mail messages comprises receiving the message across a firewall.

15. The method of claim 12, further comprising:
receiving, from the user, authentication information; and
authenticating the user based on the received authentication information.

16. The method of claim 12, further comprising:
receiving, from the user, authentication information; and
transmitting, to the source device, the received authentication information.

17. The method of claim 12, wherein:
the fourth electronic mail message contains an indication of a requested format.

18. The method of claim 12, wherein the second electronic mail message contains the requested directory in an encrypted form, the method further comprising:
decrypting the encrypted directory.

19. A computer-implemented method for remotely selecting and initiating transmission of an electronic document, comprising:
receiving, at a source device from a remote device, a first electronic mail message comprising a first request command for a directory describing a plurality of documents stored on the source device;
responsive to the received first message:
traversing the directory of the source device to generate a graphical representation of the directory comprising abridged representations of contents of each of the documents stored on the source device; and
transmitting from the source device to the remote device a second electronic mail message comprising the graphical representation of the directory, wherein the abridged representations allow the contents of the each of the documents to be easily discerned by a user of the remote device;
receiving at the source device from the remote device a third electronic mail message comprising a second request command to transmit at least one of the documents stored on the source device to an intermediate server; and
responsive to the received third message, transmitting from the intermediate server source device to at least one destination device a fourth electronic mail message comprising the requested at least one of the documents stored on the source device.

20. The method of claim 19, wherein:
the remote device comprises a personal digital assistant.

21. The method of claim 19, wherein:
the remote device comprises a handheld computer.

22. The method of claim 19, wherein:
receiving the first request command for the directory comprises receiving the first request command via wireless communication;
transmitting the received directory to the remote device comprises transmitting the received directory via wireless communication; and
receiving the second request command comprises receiving the second request command via wireless communication.

23. A system for remotely selecting and initiating transmission of an electronic document, comprising:
a storage device of a source device, for storing a plurality of documents organized in a directory of documents stored on the source device;
an inbound electronic mail processing module of the source device, for receiving from a remote device a first electronic mail message comprising a first request command for a graphical representation of the directory of documents stored on the source device;
a directory generation module, for traversing the directory of the source device to generate a graphical representation of the directory;
an electronic mail transmission module of the source device, coupled to the inbound electronic mail processing module and to the storage device, for, responsive to the received first message, transmitting to the remote device a second electronic mail message comprising the graphical representation of the directory, wherein a user interface on the remote device permits navigation throughout the graphical representation;
wherein the inbound electronic mail processing module further receives from the remote device a third electronic mail message comprising a second request command to transmit at least one of the documents stored on the source device to an intermediate server; and
wherein responsive to the received third message, the electronic mail transmission module transmits from the intermediate server to at least one destination device a fourth electronic mail message comprising the requested at least one of the documents stored on the source device.

24. The system of claim 23, wherein the remote device comprises one selected from the group consisting of:
a personal computer;
a printer;
a fax machine; and
a multifunction device.

25. The system of claim 23, wherein:
the inbound electronic mail processing module receives the first and third electronic mail messages across a firewall; and
the electronic mail transmission module transmits the second and fourth electronic mail messages across a firewall.

26. The system of claim 23, wherein the storage device comprises a hard drive.

27. The system of claim 23, further comprising:
an authentication module, coupled to the inbound electronic mail processing module, for, prior to the electronic mail transmission module transmitting the second electronic mail message, authenticating a user initiating the directory request.

28. The system of claim 23, further comprising:
an authentication module, coupled to the inbound electronic mail processing module, for, prior to the electronic mail transmission module transmitting the fourth electronic mail message, authenticating a user initiating the document request.

29. The system of claim 23, wherein the at least one stored document is stored in a first format, the system further comprising:
a document conversion module, coupled to electronic mail transmission module, for, prior to the electronic mail transmission module transmitting the fourth electronic mail message, converting the requested at least one stored document to a second format.

30. The system of claim 29, wherein the document conversion module renders the requested at least one stored document in a print-ready format.

31. The system of claim 23, wherein:
the electronic mail transmission module comprises an encryption module, for encrypting the directory; and
the second electronic mail message comprises the encrypted directory.

32. The system of claim 23, wherein:
the electronic mail transmission module comprises an encryption module, for encrypting the requested at least one stored document; and
the fourth electronic mail message comprises the encrypted at least one stored document.

33. A system for remotely selecting and initiating transmission of an electronic document, including a remote access device comprising:
an input device, for receiving, from a user, a first request command for a graphical representation of a directory describing a plurality of documents stored on the source device;
an electronic mail transmission module, coupled to the input device, for transmitting to a source device a first electronic mail message comprising the received first request command;
an inbound electronic mail processing module, for receiving from the source device a second electronic mail message comprising the graphical representation of the requested directory generated at the source device by traversing the directory stored on the source device; and
a display, coupled to the inbound electronic mail processing module, for displaying the graphical representation of the received directory, the display comprising a user interface that permits navigation throughout the graphical representation;
wherein:
the input device further receives, from the user, a third electronic message comprising a selection of at least one document from the graphical representation of the directory to be sent to an intermediate server, at least one destination identifier, and
a second request command for the selected at least one document to be sent from the intermediate server to the identified at least one destination.

34. The system of claim 33, wherein the source device comprises a personal computer.

35. The system of claim 33, wherein:
the electronic mail transmission module transmits the first and third electronic mail messages across a firewall; and
the inbound electronic mail processing module receives the second electronic mail message across a firewall.

36. The system of claim 33, wherein:
the input device receives, from the user, authentication information; and
the electronic mail transmission module transmits, to the source device, the received authentication information.

37. The system of claim 33, wherein:
the third electronic mail message contains an indication of a requested format.

38. The system of claim 33, wherein the second electronic mail message contains the requested directory in an encrypted form, the system further comprising:
a decryption module, coupled to the inbound electronic mail processing module, for decrypting the encrypted directory.

39. A system for remotely selecting and initiating transmission of an electronic document, including a source device comprising:
a storage device of the source device, for storing a plurality of documents organized in a directory of documents stored on the source device;
an inbound electronic mail processing module of the source device, for receiving, from a remote device, a first electronic mail message comprising a first request command for a graphical representation of the directory;
a directory generation module of the source device, for traversing the directory of the source device to generate a graphical representation of the directory;
a portion designation module, for determining at the source device a portion of the requested directory describing the plurality of stored documents that has been designated by a user of the source computer for remote access;
an electronic mail transmission module of the source device, coupled to the inbound electronic mail processing module and storage device, for, responsive to the received first message, transmitting to the remote device a second electronic mail message comprising the graphical representation of the directory and information indicating the portion of the requested directory designated for remote access;
wherein the inbound electronic mail processing module receives from the remote device, a third electronic message comprising a second request command to transmit at least one of the documents stored on the source device to an intermediate server and at least one destination identifier; and
wherein responsive to the received third message, the electronic mail transmission module transmits from the intermediate server to at least one destination device a fourth electronic mail message comprising the requested at least one of the documents stored on the source device.

40. The system of claim 39, wherein:
the remote device comprises a personal digital assistant.

41. The system of claim 39, wherein:
the remote device comprises a handheld computer.

42. The system of claim 39, wherein:
the inbound electronic mail processing module receives the request for the directory and the selection of at least one document from the directory via wireless communications; and
the electronic mail transmission module transmits the received directory via wireless communication.

43. The method of claim 12, wherein the information indicating the portion of the requested directory designated for remote access is configured to display only the designated portion of the directory in the graphical representation in the second electronic email message.

44. The method of claim 12, wherein the information indicating the portion of the requested directory designated for remote access is visually distinguishable in the graphical representation from the remainder of the directory.

45. The system of claim 39, wherein the information indicating the portion of the requested directory designated for remote access is configured to display only the designated portion of the directory in the graphical representation in the second electronic email message.

46. The system of claim 39, wherein the information indicating the portion of the requested directory designated for remote access is visually distinguishable in the graphical representation from the remainder of the directory.

47. A system for remotely selecting and initiating transmission of an electronic document, comprising:
a storage device of a source device, for storing a plurality of documents organized in a directory of documents stored on the source device;

an inbound electronic mail processing module of the source device, for receiving from a remote device a first electronic mail message comprising a first request command for a graphical representation of the directory comprising abridged representations of contents of each of the documents stored on the source device;

a directory generation module, for traversing the directory of the source device to generate a graphical representation of the directory;

an electronic mail transmission module of the source device, coupled to the inbound electronic mail processing module and to the storage device, for, responsive to the received first message, transmitting to the remote device a second electronic mail message comprising the graphical representation of the directory, wherein the abridged representations allow the contents of the each of the documents to be easily discerned by a user of the remote device;

wherein the inbound electronic mail processing module further receives from the remote device a third electronic mail message comprising a second request command to transmit from an intermediate server at least one of the documents stored on the source device; and wherein responsive to the received third message, the electronic mail transmission module transmits from the intermediate server to at least one destination device a fourth electronic mail message comprising the requested at least one of the documents stored on the source device.

48. The system of claim 47, wherein:

the inbound electronic mail processing module receives the first and third electronic mail messages across a firewall; and the electronic mail transmission module transmits the second and fourth electronic mail messages across a firewall.

49. The system of claim 47, further comprising:

an authentication module, coupled to the inbound electronic mail processing module, for, prior to the electronic mail transmission module transmitting the second electronic mail message, authenticating the user initiating the directory request.

50. The system of claim 47, further comprising:

an authentication module, coupled to the inbound electronic mail processing module, for, prior to the electronic mail transmission module transmitting the fourth electronic mail message, authenticating the user initiating the document request.

51. The system of claim 47, wherein the at least one stored document is stored in a first format, the system further comprising:

a document conversion module, coupled to electronic mail transmission module, for, prior to the electronic mail transmission module transmitting the fourth electronic mail message, converting the requested at least one stored document to a second format.

52. The system of claim 51, wherein the document conversion module renders the requested at least one stored document in a print-ready format.

53. The system of claim 47, wherein:

the electronic mail transmission module comprises an encryption module, for encrypting the directory; and the second electronic mail message comprises the encrypted directory.

54. The system of claim 47, wherein:

the electronic mail transmission module comprises an encryption module, for encrypting the requested at least one stored document; and the fourth electronic mail message comprises the encrypted at least one stored document.

55. The method of claim 19, wherein the abridged representations comprise at least one from the group consisting of document thumbnails and document summaries.

56. The method of claim 19, wherein the abridged representations are searchable by the user.

57. The system of claim 47, wherein the abridged representations comprise at least one from the group consisting of document thumbnails and document summaries.

58. The system of claim 47, wherein the abridged representations are searchable by the user.

* * * * *

UNITED STATES PATENT AND TRADEMARK OFFICE
CERTIFICATE OF CORRECTION

PATENT NO. : 7,428,578 B1  Page 1 of 1
APPLICATION NO. : 10/188912
DATED : September 23, 2008
INVENTOR(S) : Jonathan J. Hull and Derek E. Poppink It is certified that error appears in the above-identified patent and that said Letters Patent is hereby corrected as shown below:

Title Page, item [75] Inventors, insert --.-- after "J" in first inventor's name Title Page, item [75] Inventors, insert --.-- after "E" in second inventor's name Column 18, Line 61, Claim 12
Please delete "source device"

Column 19, Line 47, in Claim 19
Please delete "source device"

Signed and Sealed this

Thirtieth Day of December, 2008

JON W. DUDAS
*Director of the United States Patent and Trademark Office*